(12) United States Patent
Nishida et al.

(10) Patent No.: US 6,230,506 B1
(45) Date of Patent: May 15, 2001

(54) HEAT PUMP CYCLE SYSTEM

(75) Inventors: Shin Nishida, Anjo; Yukikatsu Ozaki, Nishio; Naruhide Kimura, Nishio; Tadashi Hotta, Nishio; Motohiro Yamaguchi, Hoi-gun, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/378,833

(22) Filed: Aug. 23, 1999

(30) Foreign Application Priority Data

Aug. 24, 1998 (JP) .................................................. 10-237450
Jul. 9, 1999 (JP) .................................................. 11-196349

(51) Int. Cl.⁷ .................................................. F25B 41/04
(52) U.S. Cl. .............................. 62/223; 62/224; 62/211; 62/212; 62/160
(58) Field of Search .............................. 62/222, 223, 224, 62/524, 526, 217, 507, 324.1, 211, 160, 212

(56) References Cited

U.S. PATENT DOCUMENTS

| | | | |
|---|---|---|---|
| 5,181,392 | * | 1/1993 | Itoh et al. ................................ 62/160 |
| 5,205,347 | * | 4/1993 | Hughes ..................................... 165/1 |
| 5,890,370 | * | 4/1999 | Sakakibara et al. .................... 62/222 |
| 5,934,094 | * | 8/1999 | Itoh et al. ............................... 62/222 |
| 6,047,770 | * | 4/2000 | Suzuki et al. ......................... 165/202 |
| 6,073,459 | * | 6/2000 | Iritani ..................................... 60/204 |
| 6,116,048 | * | 9/2000 | Hebert ................................... 62/525 |

FOREIGN PATENT DOCUMENTS 9-264622   10/1997 (JP) .

* cited by examiner

*Primary Examiner*—Harry B. Tanner
(74) *Attorney, Agent, or Firm*—Harness, Dickey & Pierce, PLC

(57) ABSTRACT

A heat pump cycle system which can switches cooling operation and heating operation for a compartment includes a first inside heat exchanger and a second inside heat exchanger disposed in an air conditioning case. The first inside heat exchanger is disposed in the air conditioning case at a downstream air side of the second inside heat exchanger, while being arranged in line in a flow direction of refrigerant. The first inside heat exchanger is upstream from the second inside heat exchanger in the flow direction of refrigerant during the heating operation. In the heat pump cycle system, an expansion valve is controlled so that coefficient of performance in each operation becomes approximately maximum. Thus, during the heating operation of the heat pump cycle system, a lower limit temperature of air blown from the inside heat exchangers can be increased so that temperature of air blown into the compartment is increased, while the coefficient of performance is improved.

16 Claims, 27 Drawing Sheets

HEAT PUMP CYCLE SYSTEM

CROSS-REFERENCE TO RELATED APPLICATION

This application is related to and claims priority from Japanese Patent Applications No. Hei. 10-237450 filed on Aug. 24, 1998 and No. Hei. 11-196349 filed on Jul. 9, 1999, the contents of which are hereby incorporated by reference.

BACKGROUND OF THE INVENTION

1. Field of the Invention:

The present invention relates to a heat pump cycle system in which pressure of refrigerant discharged from a compressor exceeds the critical pressure and carbon dioxide ($CO_2$) is used as refrigerant. The heat pump cycle system can set cooling operation and heating operation.

2. Description of Related Art:

A vapor-compression type refrigerant cycle using carbon dioxide ($CO_2$) as refrigerant (hereinafter, referred to as "$CO_2$ refrigerant cycle") is disclosed in JP-A-9-264622 by the applicant of the present invention. To increase cooling capacity of the $CO_2$ refrigerant cycle, pressure of high-pressure side refrigerant is need to be increased. However, when the pressure of high-pressure side refrigerant is simply increased, coefficient of performance of the $CO_2$ refrigerant cycle is deteriorated. Thus, in the conventional $CO_2$ refrigerant cycle, temperature of refrigerant on an outlet side of a radiator is controlled, so that cooling capacity of the $CO_2$ refrigerant cycle is controlled while the coefficient of performance of the $CO_2$ refrigerant cycle becomes higher. However, the conventional $CO_2$ refrigerant cycle is only for increasing the cooling capacity of the $CO_2$ refrigerant cycle. Therefore, when the $CO_2$ refrigerant cycle is applied to a heat pump cycle system which can selectively switch cooling operation and heating operation, the pressure of high-pressure side refrigerant where the coefficient of performance becomes maximum during the cooling operation does not correspond to the pressure of high-pressure side refrigerant where the coefficient of performance becomes maximum during the heating operation. As a result, when the control of the cooling operation is simply applied to the heating operation in the conventional $CO_2$ refrigerant cycle, the coefficient of performance during the heating operation is deteriorated.

Further, in the $CO_2$ refrigerant cycle, $CO_2$ refrigerant is in a supercritical state on the high-pressure side and $CO_2$ refrigerant is not condensed in a radiator. Therefore, as $CO_2$ refrigerant flows from a refrigerant inlet side toward a refrigerant outlet side within the radiator, temperature of $CO_2$ refrigerant is gradually decreased. Thus, temperature of air blown into a passenger compartment is approximately the average temperature of radiator. To increase the temperature of air blown into the passenger compartment during the heating operation, the temperature of $CO_2$ refrigerant on the refrigerant inlet side of the radiator is need to be increased so that the average temperature of air passing through the radiator is increased. In this case, because it is necessary to increase the pressure of $CO_2$ refrigerant discharged from the compressor, the coefficient of performance of the $CO_2$ refrigerant cycle may be deteriorated.

SUMMARY OF THE INVENTION

In view of the foregoing problems, it is an object of the present invention to provide a heat pump cycle system which can set cooling operation and heating operation for a compartment while preventing coefficient of performance from being deteriorated during the heating operation.

It is an another object of the present invention to provide a heat pump cycle system which improves heating capacity while improving coefficient of performance during heating operation.

According to the present invention, a heat pump cycle system includes a compressor for compressing refrigerant, a case for forming therein an air passage through which air flows toward a compartment, a first heat exchanger disposed in the case for performing heat exchange between air inside the case and refrigerant flowing therein, a second heat exchanger disposed outside the case for performing heat exchange between air outside the case and refrigerant flowing therein, a refrigerant pipe forming a refrigerant passage through which refrigerant in the first heat exchanger and refrigerant in the second heat exchanger communicate with each other, an expansion valve disposed in the refrigerant passage for reducing pressure of refrigerant, and a switching unit for switching a communication between a discharge port of the compressor and an inlet of the first heat exchanger and a communication between the discharge port of the compressor and an inlet of the second heat exchanger. In the heat pump cycle system, the compressor discharges refrigerant with a pressure higher than the critical pressure, the first heat exchanger includes a plurality of first heat-exchanging portions arranged in line relative to a flow direction of air flowing through the air passage, the first heat-exchanging portions of the first heat exchanger are connected in line relative to a flow direction of refrigerant flowing therein, and one of the first heat-exchanging portions, at a most downstream side relative to the flow direction of air, is placed at a most upstream side relative to the flow direction of refrigerant during the heating operation. Thus, a lower limit temperature of air blown from the first heat exchanger can be increased, and the temperature of air from the first heat exchanger into the compartment can be increased.

Preferably, the expansion valve is controlled based on temperature of refrigerant in any a position from a refrigerant outlet of a most upstream heat-exchanging portion and a refrigerant inlet of a most downstream heat exchanging portion relative to the flow direction of refrigerant during the heating operation. Therefore, an opening degree of the expansion valve can be controlled based on a relatively high temperature of refrigerant, and the heat pump cycle system is controlled so that the discharge pressure of the compressor becomes higher even when the control of expansion valve during the heating operation is the same as that during the cooling operation. Thus, the control of the expansion valve can be made simple, while the heat pump cycle system prevents both the heating capacity and the coefficient of performance from being deteriorated.

More preferably, the heat pump cycle system further includes a control unit for controlling an opening degree of the expansion valve. The control unit includes a temperature setting unit for setting a temperature of the compartment, an air temperature sensor for detecting a temperature of air before flowing into the first heat exchanger, and a target pressure determining unit for determining a target pressure of refrigerant discharged from the discharge port of the compressor during the heating operation based on the temperature detected by the air temperature sensor and the temperature set by the temperature setting unit, so that coefficient of performance becomes approximately maximum. In the heat pump cycle system, the control unit controls the opening degree of the expansion valve in such a manner that pressure of refrigerant discharged from the compressor becomes the target pressure. Thus, the heat pump cycle system can perform the heating operation while preventing the coefficient of performance from being deteriorated.

On the other hand, the control unit includes a first target pressure determining unit for determining a first target pressure of refrigerant discharged from the compressor during the heating operation based on the temperature set by the temperature setting unit so that coefficient of performance becomes maximum, and a second target pressure determining unit for determining a second target pressure of refrigerant discharged from the compressor during the cooling operation based on the temperature set by the temperature setting unit, so that coefficient of performance becomes maximum. In the heat pump cycle system, the control unit controls the opening degree of the expansion valve in such a manner that pressure of refrigerant discharged from the compressor becomes the first target pressure during the heating operation, and pressure of refrigerant discharged from the compressor becomes the second target pressure during the cooling operation. Thus, the heat pump cycle system can perform both the heating operation and cooling operation without reducing the coefficient of performance. Further, the opening degree of the expansion valve is controlled so that the first target pressure is in a range of 9 MPa–11 MPa. Therefore, the heat pump cycle system can be operated while the coefficient of performance becomes approximately maximum.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PRESENTLY PREFERRED EMBODIMENTS

Preferred embodiments of the present invention will be described hereinafter with reference to the accompanying drawings.

Figure 1:
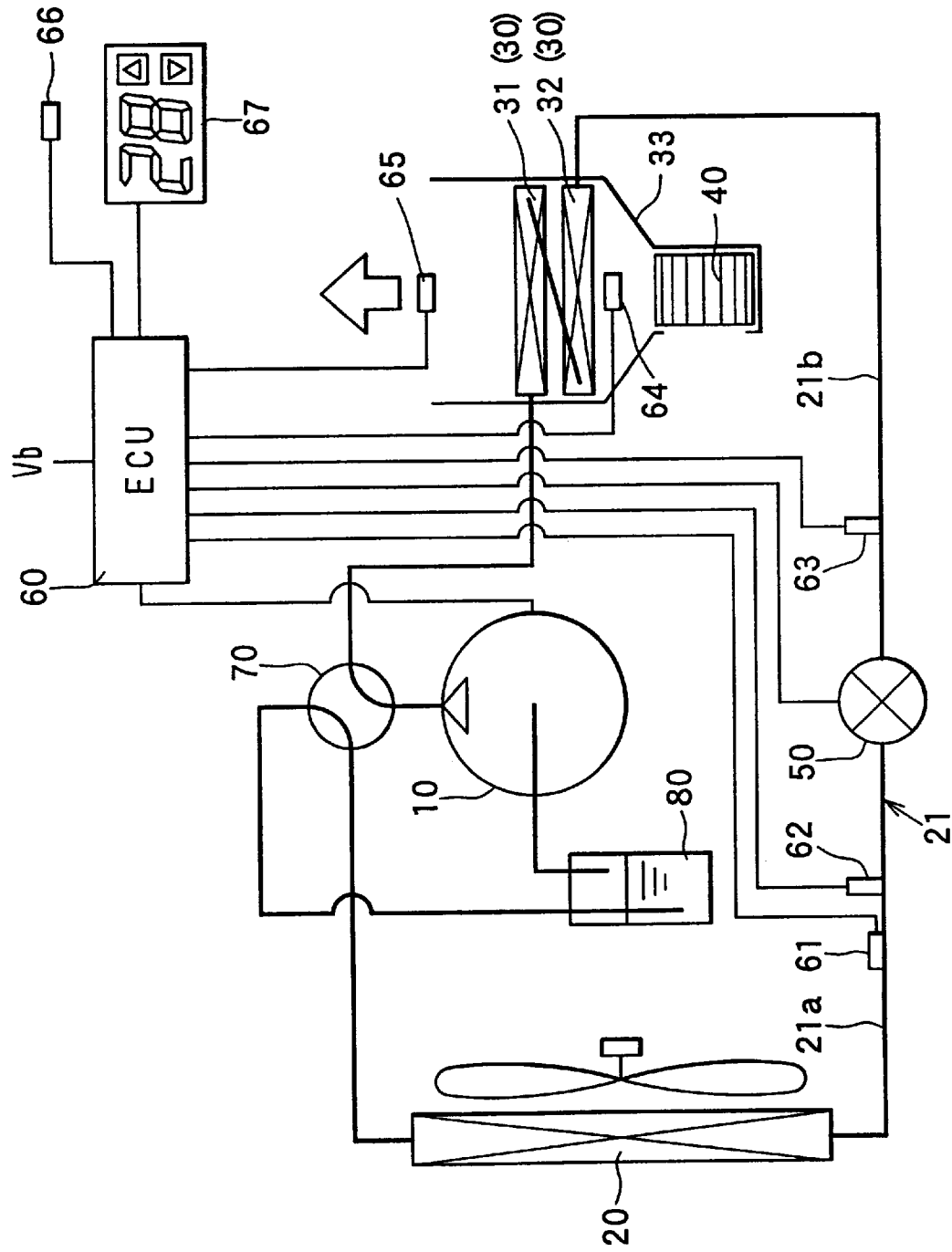
FIG. 1 is a schematic view showing a heat pump cycle system during heating operation according to a first preferred embodiment of the present invention.
Figure 2:
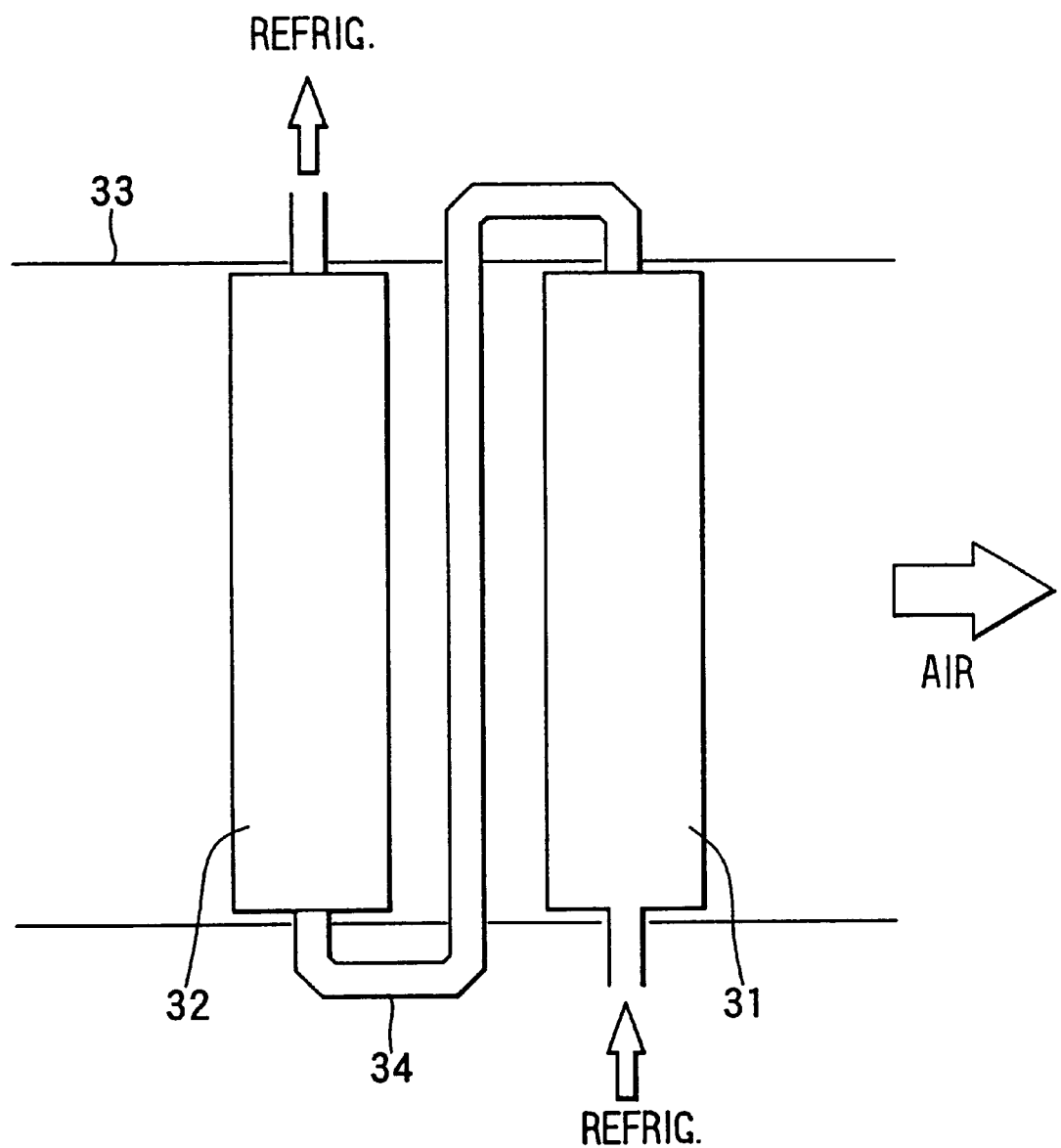
FIG. 2 is an enlarged view of an inside heat exchanger according to the first embodiment.

A first preferred embodiment of the present invention will be now described with reference to FIGS. 1–11. In the first embodiment, a heat pump cycle system of the present invention is typically applied to a vehicle air conditioner using $CO_2$ as refrigerant. FIG. 1 shows a schematic view of the heat pump cycle system. In FIG. 1, a compressor 10 compresses refrigerant to have a pressure equal to or more than the critical pressure, and discharges the compressed refrigerant. In the first embodiment of the present invention, the compressor 10 is integrated with an electrical motor (not shown) for driving the compressor 10. An outside heat exchanger 20 is disposed in the heat pump cycle system so that refrigerant and air outside a passenger compartment of the vehicle are heat-exchanged in the outside heat exchanger 20. On the other hand, air to be introduced into the passenger compartment is heat-exchanged with refrigerant in first and second inside heat exchangers 31, 32. Both of the first and second inside heat exchangers 31, 32 are refereed to as an inside heat exchanger 30 in total. As shown in FIG. 2, the first inside heat exchanger 31 is disposed at an upstream refrigerant side of the second inside heat exchanger 32 in a refrigerant flow direction during heating operation. Further, the first inside heat exchanger 31 and the second heat exchanger 32 are disposed within an air-conditioning case 33 in such a manner that the first inside heat exchanger 31 is placed at a downstream air side from the second inside heat exchanger 32 in an air-flow direction. Air is blown toward the first and second inside heat exchangers 31, 32 by a centrifugal type blower 40, as shown in FIG. 1.

Further, as shown in FIG. 1, an expansion valve 50 (i.e., decompressing unit) for controlling pressure of refrigerant discharged from the compressor 10 is disposed in a refrigerant passage 21 connecting the inside heat exchanger 30 and the outside heat exchanger 20. By controlling opening degree of the expansion valve 50, refrigerant is decompressed to a predetermined pressure, and the pressure of refrigerant discharged from the compressor 10 can be controlled. The expansion valve 50 is controlled by an electronic control unit (ECU) 60.

A first temperature sensor 61 detects temperature of refrigerant in a refrigerant passage 21a of the refrigerant passage 21, between the outside heat exchanger 20 and the expansion valve 50, and a first pressure sensor 62 detects pressure of refrigerant in the refrigerant passage 21a between the outside heat exchanger 20 and the expansion valve 50. Further, a second pressure sensor 63 detects pressure of refrigerant in a refrigerant passage 21b of the refrigerant passage 21, between the inside heat exchanger 30 and the expansion valve 50. A second temperature sensor 64 is disposed in the air-conditioning case 33 on an upstream air side of the second inside heat exchanger 32 to detect temperature of air immediately before introducing into the second inside heat exchanger 32, a third temperature sensor 65 is disposed to detect temperature of air after passing through the first inside heat exchanger 31, and a fourth temperature sensor 66 is disposed to detect temperature within the passenger compartment. A desired temperature of the passenger compartment is set in a temperature setting unit 67 by a passenger. Each detected value of the sensors 61–66, the set temperature set by the temperature setting unit 67 and voltage (Vb) applied to an electrical motor (not shown) for driving the centrifugal type blower 40 are input into the ECU 60. The ECU 60 controls the opening degree of the expansion valve 50, a rotation speed of the compressor 10 and an electromagnetic four way valve 70 based on input signals in accordance with a pre-set program.

The four way valve 70 switches a refrigerant flow from the compressor 10. That is, a refrigerant flow from a discharge port of the compressor 10 to the inside heat exchanger 30 and a refrigerant flow from the discharge port of the compressor 10 to the outside heat exchanger 20 are switched by the four way valve 70. Refrigerant circulating in the $CO_2$ refrigerant cycle is stored in accumulator 80.

Refrigerant within the accumulator 80 is separated into gas refrigerant and liquid refrigerant, and the separated gas refrigerant is introduced into a refrigerant suction side of the compressor 10.

Next, operation of the heat pump cycle system according to the first embodiment of the present invention will be now described.

(1) Cooling Operation

Figure 3:
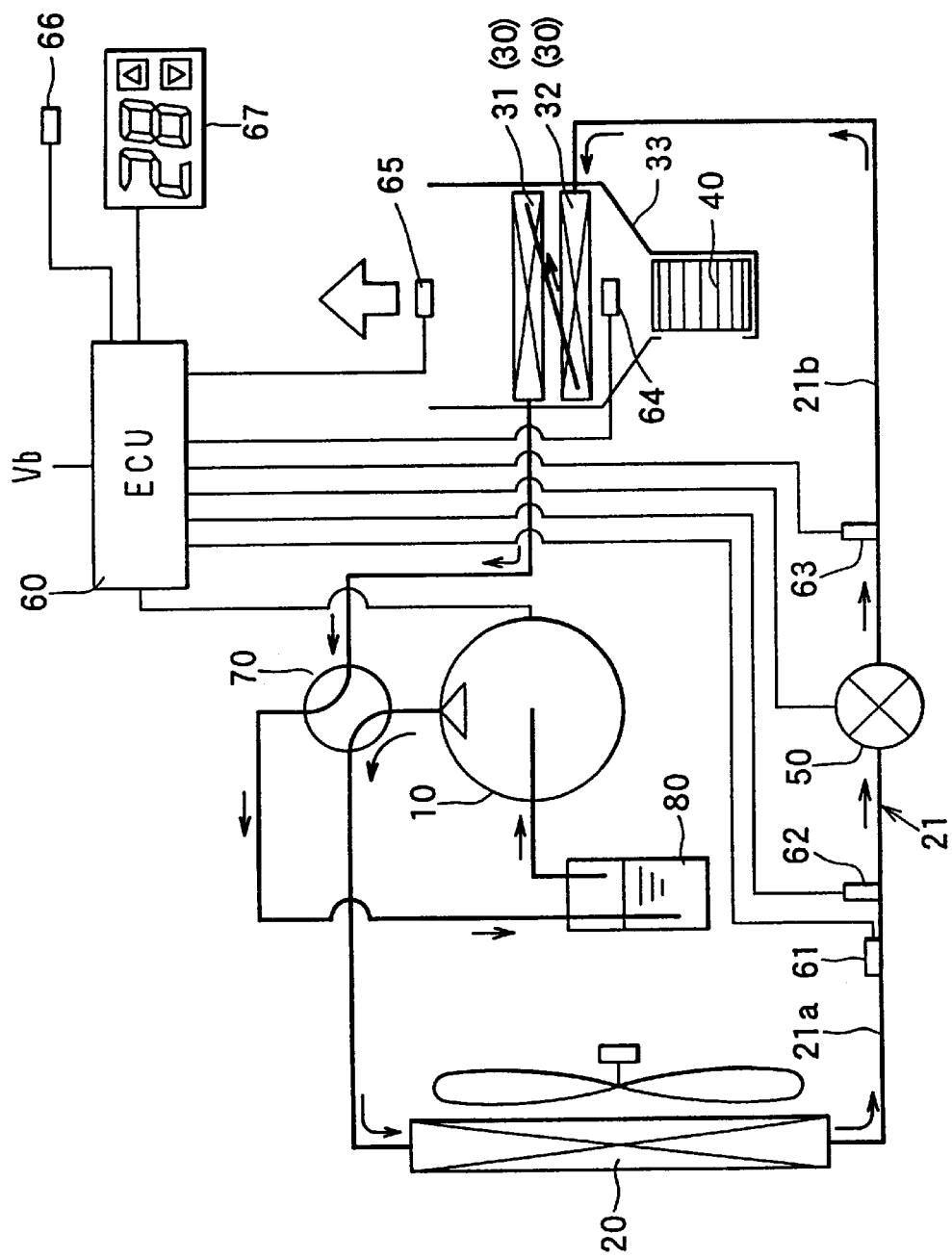
FIG. 3 is a schematic view showing the heat pump cycle system during cooling operation according to the first embodiment.

During the cooling operation, as shown in FIG. 3, refrigerant discharged from the compressor 10 is cooled in the outside heat exchanger 20, is decompressed in the expansion valve 50, is evaporated in the inside heat exchanger 30 by absorbing heat from air in the air conditioning case 33, and is sucked into the compressor 10 after passing through the accumulator 80. Therefore, air passing through the inside heat exchanger 30 is cooled during the cooling operation. In this case, pressure of refrigerant (i.e., high-pressure side refrigerant) on an outlet side of the outside heat exchanger 20 is controlled by the expansion valve 50 based on the temperature of refrigerant on the outlet side of the outside heat exchanger 20, detected by the first temperature sensor 61.

Figure 4:
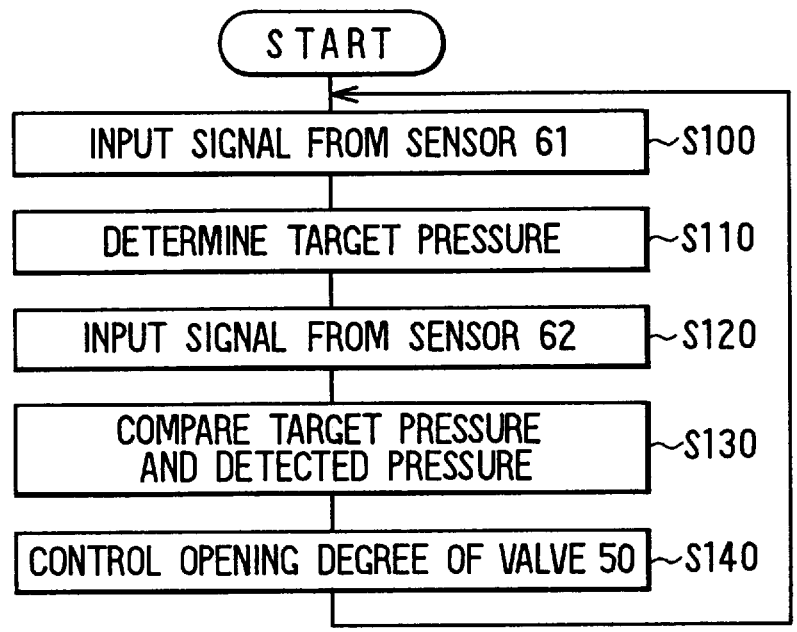
FIG. 4 is a flow diagram for controlling an expansion valve of the heat pump cycle system during the cooling operation according to the first embodiment.
Figure 5:
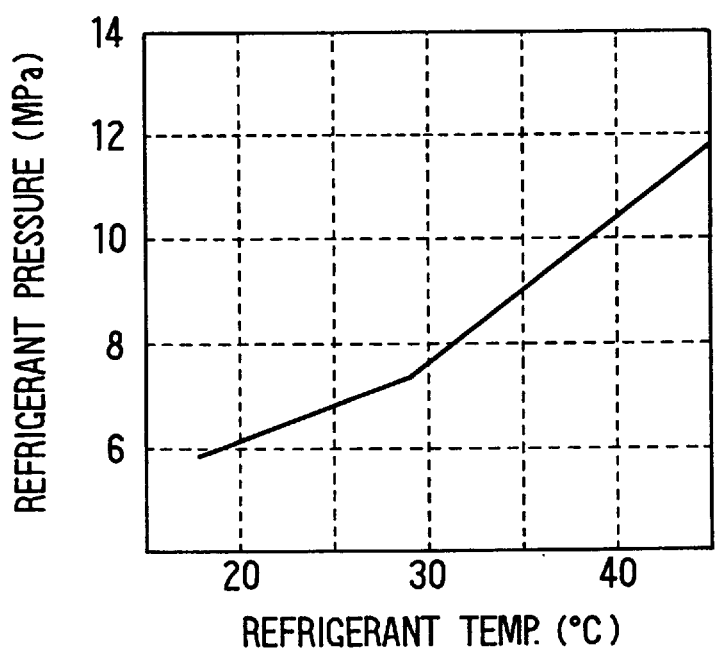
FIG. 5 is a graph showing the relationship between a refrigerant temperature and a refrigerant pressure on an outlet side of an outside heat exchanger when coefficient of performance of the heat pump cycle system becomes maximum during the cooling operation.

Here, the control of the expansion valve 50 will be now described in detail based on the flow diagram shown in FIG. 4. Firstly, temperature detected by the first temperature sensor 61 is input at step S100. Then, a target pressure during the cooling operation is determined from the relationship between refrigerant temperature and refrigerant pressure shown in FIG. 5, at step S110. The graph shown in FIG. 5 is a suitable control line during the cooling operation, that is, shows the refrigerant pressure on the outlet side of the outside heat exchanger 20, where coefficient of performance becomes maximum relative to the refrigerant temperature on the outlet side of the outside heat exchanger 20.

Next, pressure detected by the first pressure sensor 62 is input at step S120, and the detected pressure detected by the first pressure sensor 62 and the determined target pressure during the cooling operation is compared at step S130. When the detected pressure detected by the first pressure sensor 62 is larger than the target pressure during the cooling operation, the opening degree of the expansion valve 50 is increased so that pressure of refrigerant (i.e., high-pressure side refrigerant) discharged from the outside heat exchanger 20 is decreased, at step S140. On the other hand, the detected pressure detected by the first pressure sensor 62 is smaller than the target pressure during the cooling operation, the opening degree of the expansion valve 50 is decreased so that refrigerant pressure discharged from the outside heat exchanger 20 is decreased at step S140. Further, when the detected pressure detected by the first pressure sensor 62 is equal to the target pressure during the cooling operation, the opening degree of the expansion valve 50 is maintained, at step S140. Thereafter, the program returns to step S100, and repeats the operations of steps S100–S140.

(2) Heating Operation

During the heating operation, as shown in FIG. 1, refrigerant discharged from the compressor 10 is cooled in the inside heat exchanger 30 so that air passing through the inside heat exchanger 30 is heated. Thereafter, refrigerant from the inside heat exchanger 30 is decompressed in the expansion valve 50, is evaporated in the outside heat exchanger 20 by absorbing heat from outside air, and is sucked into the compressor 10 after passing through the accumulator 80. During the heating operation, pressure of refrigerant (i.e., high-pressure side refrigerant) on the outlet side of the inside heat exchanger 30 is controlled to be a target pressure which is determined based on a target air temperature of the passenger compartment and an amount of air to be introduced into the inside heat exchanger 30. The target air temperature of the passenger compartment is determined based on the temperature detected by the second temperature sensor 64, a set temperature set by the temperature setting unit 67, and the temperature detected by the fourth temperature sensor 66. Further, the amount of air to be introduced into the inside heat exchanger 30 is determined based on voltage (Vb) applied to the blower motor of the blower 40.

Figure 6:
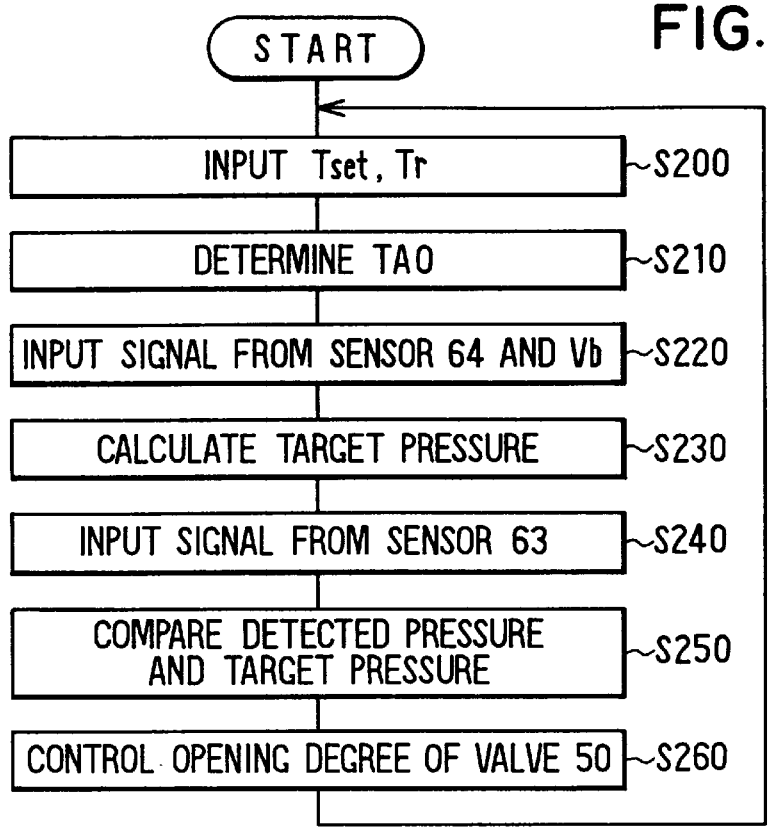
FIG. 6 is a flow diagram for controlling the expansion valve of the heat pump cycle system during the heating operation according to the first embodiment.

Next, control of the electric expansion valve 50 during the heating operation will be now described in detail based on the flow diagram shown in FIG. 6. Firstly, the set temperature (Tset) set by the temperature setting unit 67 and the temperature (Tr) inside the passenger compartment are input at step S200. Next, at step S210, the target air temperature (TAO) of the passenger compartment is determined at step S210 based on the set temperature (Tset) and the temperature (Tr) of the passenger compartment. Next, air temperature detected by the second temperature sensor 64 and voltage (Vb) applied to the motor of the blower 40 are input at step S220, and a target pressure during the heating operation is calculated based on the air temperature detected by the second temperature sensor 64, the voltage (Vb) and the target air temperature (TAO) in accordance with a predetermined map (not shown) at step S230. Further, pressure detected by the second pressure sensor 63 is input at step S240, and the detected pressure and the target pressure of refrigerant are compared at step S250. Next, the opening degree of the expansion valve 50 is controlled based on the detected pressure and the target pressure of refrigerant, at step S260. That is, when the detected pressure of refrigerant is larger than the target pressure of refrigerant, the opening degree of the electric expansion valve 50 is increased so that the pressure of refrigerant discharged from the inside heat exchanger 30 is decreased. On the other hand, when the detected pressure of refrigerant is smaller than the target pressure of refrigerant, the opening degree of the electric expansion valve 50 is decreased so that the pressure of refrigerant discharged from the inside heat exchanger 30 is increased. Further, when the detected pressure of refrigerant is equal to the target pressure of refrigerant, the opening degree of the expansion valve 50 is maintained. Thereafter, the program returns to step S200, and repeats the operations of steps S200–S260.

Further, in the first embodiment, the rotation speed of the compressor 10 is controlled in such a manner that temperature detected by the third temperature sensor 65 is approximately equal to the target air temperature. That is, when the temperature detected by the third temperature sensor 65 is lower that the target air temperature, the rotation speed of the compressor 10 is increased. On the other hand, when the temperature detected by the third temperature sensor 65 is higher than the target air temperature, the rotation speed of the compressor id decreased.

Figure 7:
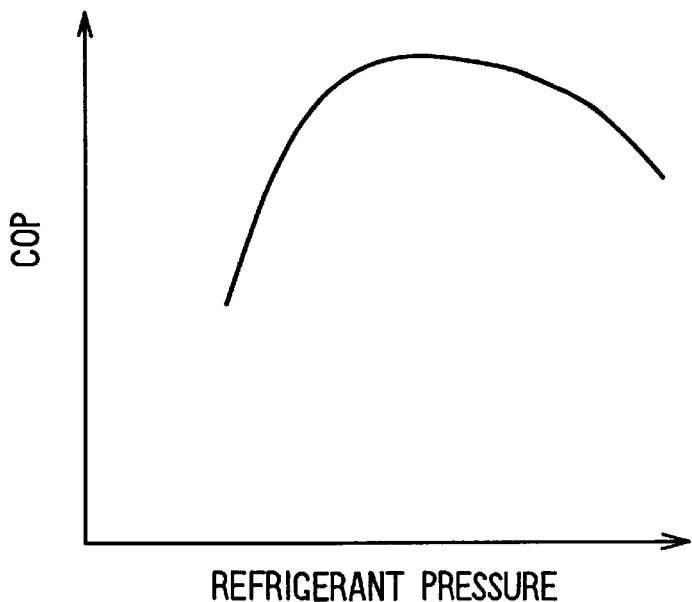
FIG. 7 is a graph showing the relationship between the coefficient of performance of the heat pump cycle system and a pressure of a high-pressure side refrigerant during the heating operation, according to the first embodiment.

Next, the target pressure of refrigerant (high-pressure side refrigerant) on the outlet side of the inside heat exchanger 30 during the heating operation will be now described. During the heating operation, temperature of air blown into the passenger compartment is increased in accordance with an increase of the pressure of refrigerant discharged from the inside heat exchanger 30. As shown in FIG. 7, the coefficient (COP) of performance is changed to have a maximum value relative to the refrigerant pressure of the inside heat exchanger 30, during the heating operation. Further, the refrigerant pressure where the coefficient (COP) of performance becomes maximum is changed by the temperature of air flowing into the inside heat exchanger 30 and the amount of air introducing into the inside heat exchanger 30. Thus, in the first embodiment of the present invention, the target pressure of high-pressure side refrigerant on the outlet side of the inside heat exchanger 30 during the heating operation is determined based on the temperature of air flowing into the inside heat exchanger 30, the air amount (i.e., blower voltage Vb) flowing into the inside heat exchanger 30 and the target air temperature (TAO). Here, the meaning that the coefficient of performance becomes maximum does not indicate a strict maximum point. That is, the target pressure is calculated to have a change range of ±1 MPa relative to maximum point of the coefficient of performance.

Figure 8:
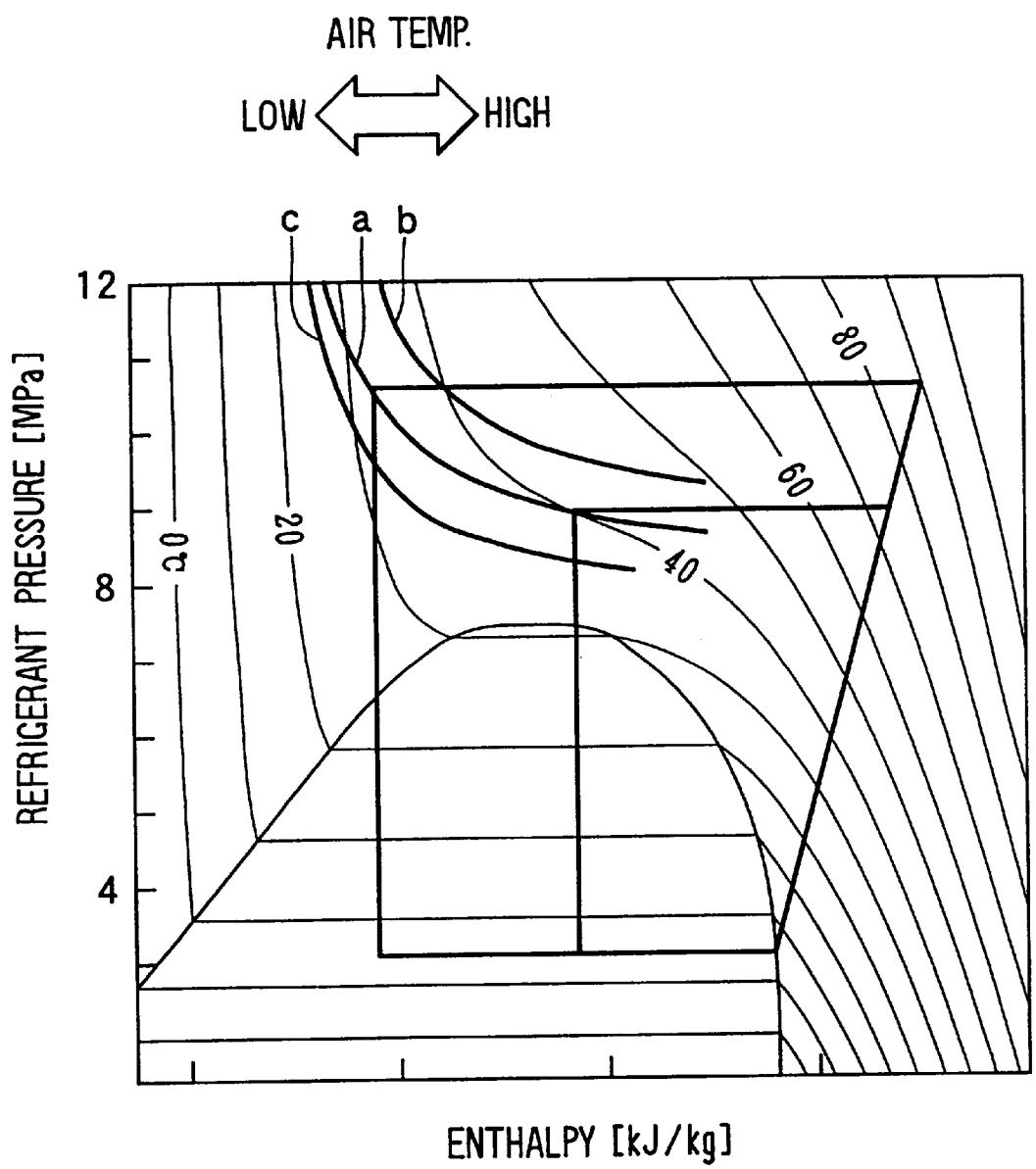
FIG. 8 is a Mollier diagram of $CO_2$ refrigerant of the heat pump cycle system according to the first embodiment.

FIG. 8 shows a Mollier diagram of the $CO_2$ refrigerant in the heat pump cycle system. In FIG. 8, the solid line "a" is a locus showing a temperature change of refrigerant on the outlet side of the inside heat exchanger 30 (i.e., the second inside heat exchanger 32) when the refrigerant pressure discharged from the inside heat exchanger (i.e., the second inside heat exchanger 32) is changed, in a case where the rotation speed of the compressor 10 and the opening degree of the expansion valve 50 are controlled so that the temperature and the amount of air flowing into the inside heat exchanger 30 is made constant and the target air temperature becomes constant. As shown by the solid line "a" in FIG. 8, when the pressure of refrigerant discharged from the inside heat exchanger 30 (i.e., the second inside heat exchanger 32) is increased, an enthalpy difference and a temperature difference between refrigerant on the inlet side of the inside heat exchanger 30 (i.e., the first inside heat exchanger 31) and refrigerant on the outlet side of the inside heat exchanger 30 (i.e., the second inside heat exchanger 32) are increased. Even when the target air temperature is constant, the pressure and temperature of refrigerant on the outlet side of the inside heat exchanger 30 man be greatly changed.

In FIG. 8, the solid line "b" is a locus showing a temperature change of refrigerant on the outlet side of the inside heat exchanger 30 (i.e., the second inside heat exchanger 32) when the temperature of air flowing into the inside heat exchanger 30 is increased when the amount of air flowing into the inside heat exchanger 30 is made constant. Further, the solid line "c" in FIG. 8 is a locus showing a temperature change of refrigerant on the outlet side of the inside heat exchanger 30 (i.e., the second inside heat exchanger 32) when the temperature of air flowing into the inside heat exchanger 30 is decreased when the air amount of air flowing into the inside heat exchanger 30 is made constant.

According to the first embodiment of the present invention, refrigerant (hereinafter, the refrigerant is referred to as "high-pressure side refrigerant) flowing from the discharge side of the compressor 10 to a suction side of the expansion valve 50 is not condensed as shown in FIG. 8. Therefore, the temperature of high-pressure side refrigerant is changed to be decreased from the discharge side of the compressor 10 toward the suction side of the expansion valve 50.

Figure 9A:
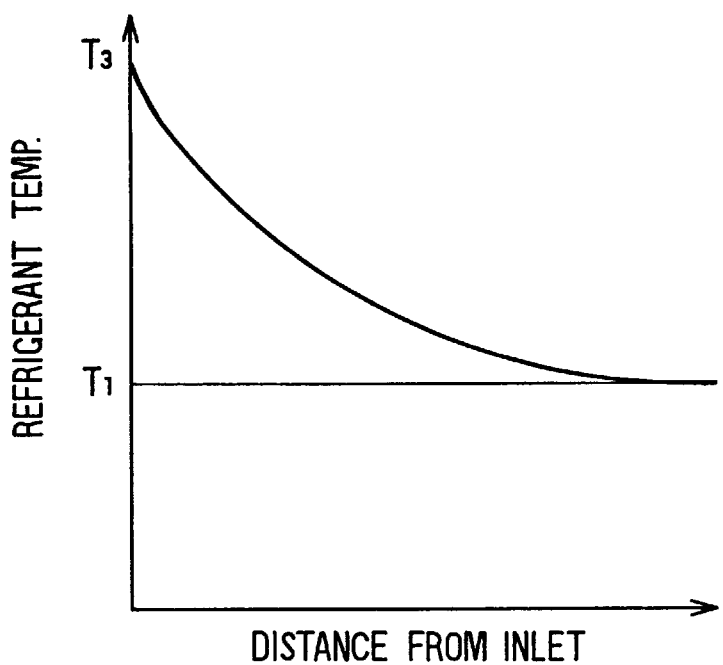
FIG. 9A is a graph showing a temperature distribution of a single inside heat exchanger.
Figure 9B:
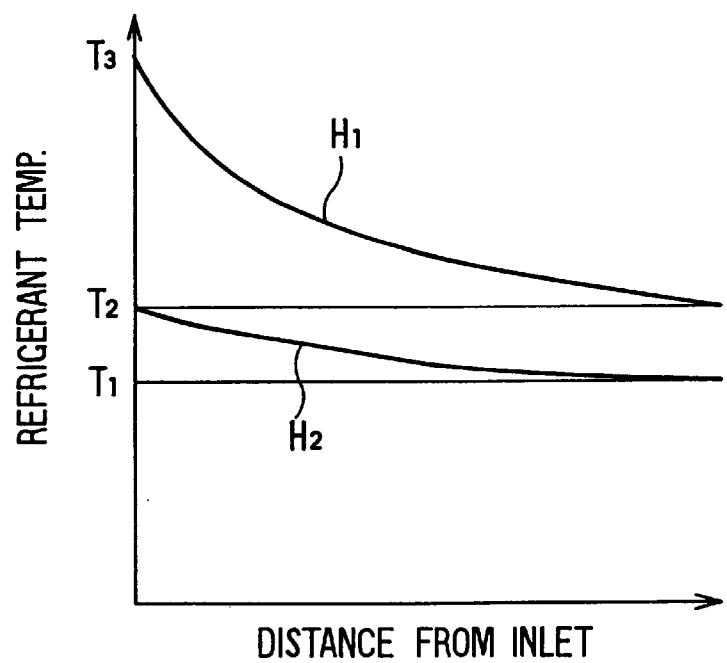
FIG. 9B is a graph showing a temperature distribution of first and second inside heat exchangers of the first embodiment.

Thus, in a case where the inside heat exchanger is constructed by a single heat exchanger, the inside heat exchanger has a temperature distribution shown in FIG. 9A during the heating operation. That is, as shown in FIG. 9A, the temperature of refrigerant is decreased from the refrigerant inlet of the inside heat exchanger toward the refrigerant outlet. As the distance from the inlet of the inside heat exchanger becomes longer, the temperature of refrigerant becomes lower. Therefore, when the inside heat exchanger is constructed by the single heat exchanger, air passing through the inside heat exchanger in the air-conditioning case 33 has a temperature distribution corresponding to the temperature distribution of the inside heat exchanger.

According to the first embodiment of the present invention, the inside heat exchanger 30 is composed of the first and the second inside heat exchangers 31, 32, the first inside heat exchanger 31 (H1) is disposed on the upstream side of the second inside heat exchanger 32 (H2) in the refrigerant flow direction of the heating operation. Therefore, the temperature of air passing through the inside heat exchanger 30 has a temperature distribution range between an air temperature corresponding to the temperature of refrigerant on the inlet side of the first inside heat exchanger 31 (H1) and an air temperature corresponding to the temperature of refrigerant on the outlet side of the first inside heat exchanger 31. Thus, it is compared with the inside heat exchanger constructed by the single heat exchanger, a low limit side temperature within the temperature distribution range is increased, thereby increasing temperature of air blown from the inside heat exchanger 30 without increasing the pressure of high-pressure side refrigerant. As a result, it can prevent compression operation of the compressor 10 from increasing and coefficient of performance from being deteriorated, while temperature of air blown from the inside heat exchanger 30 is increased during the heating operation.

During the heating operation, air passing through the inside heat exchanger 30 is heated, and the heated air temperature is increased as air flows toward downstream. Therefore, as air passing through the inside heat exchanger 30 flows downward, the temperature difference between refrigerant flowing through the inside heat exchanger 30 and air passing through the inside heat exchanger 30 becomes smaller, and heat-exchanging amount between air and refrigerant in the inside heat exchanger 30 becomes smaller.

Figure 10A:
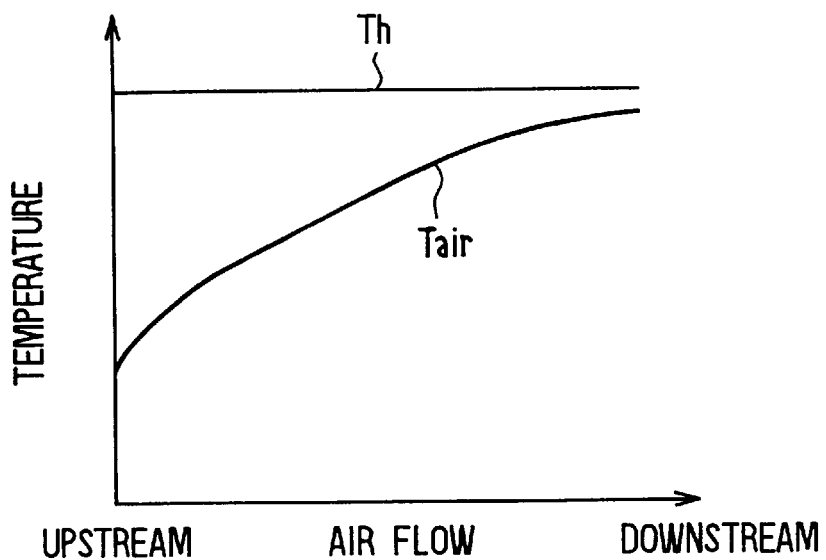
FIG. 10A is a graph showing the relationship between a temperature and an air flow in the single inside heat exchanger.
Figure 10B:
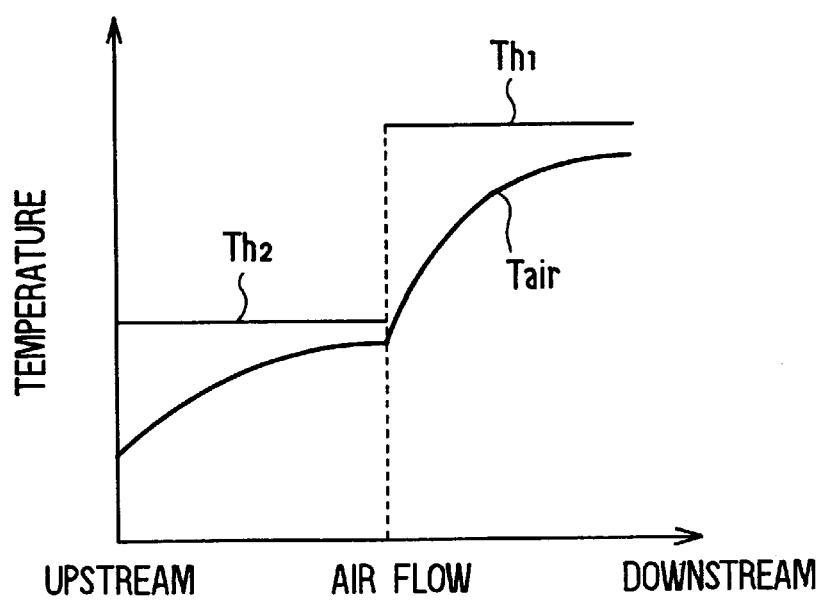
FIG. 10B is a graph showing a temperature and an air flow in the first and second heat exchangers of the first embodiment.

If the inside heat exchanger is formed by the single heat exchanger, a temperature difference between temperature (Tair) of air passing through the inside heat exchanger and the inside heat exchanger (Th) becomes smaller as air flows toward downstream, as shown in FIG. 10A. Therefore, in this case, heat-exchanging amount between air and refrigerant also becomes smaller, as air flows toward downstream in the inside heat exchanger.

Figure 11:
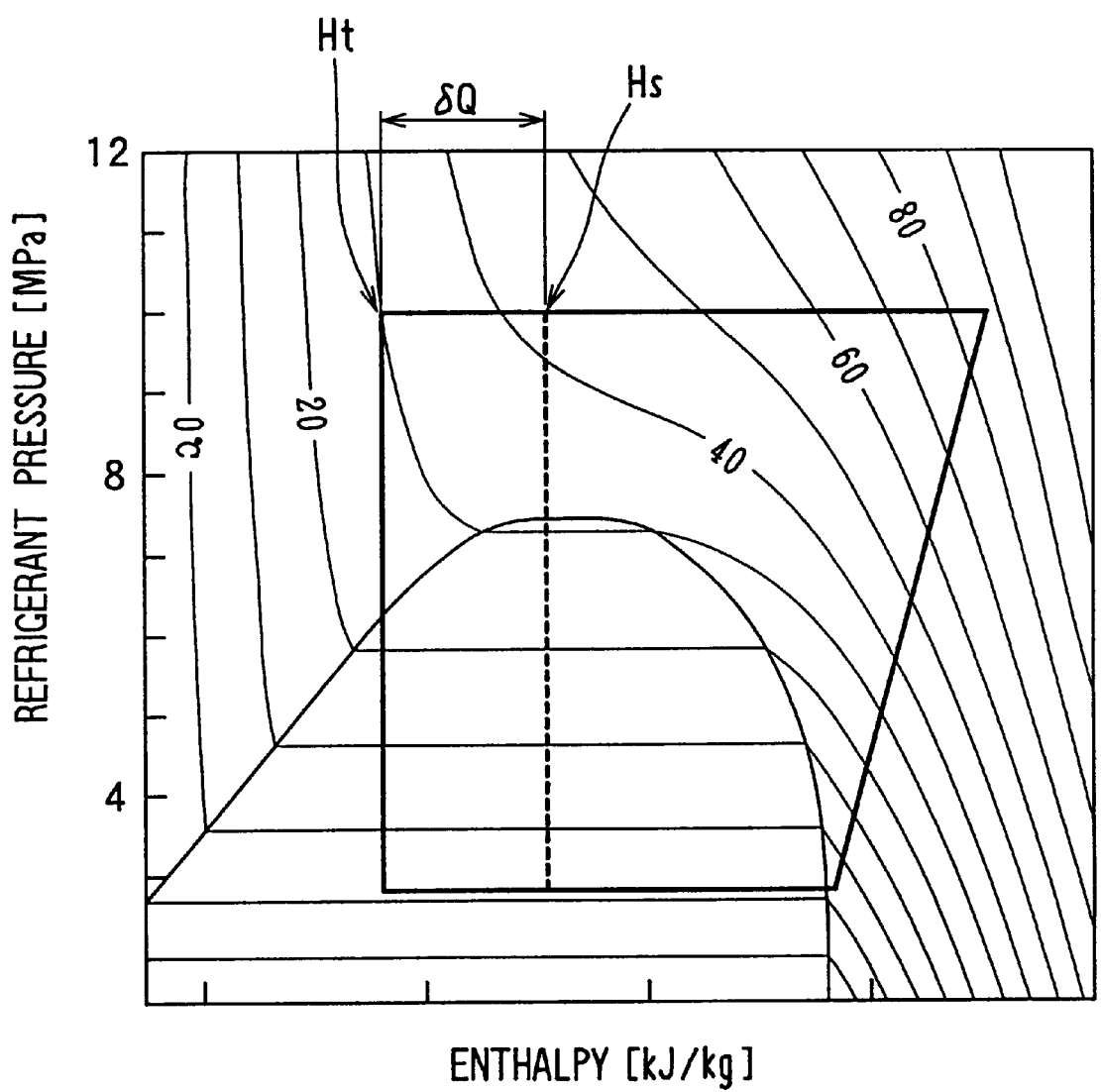
FIG. 11 is an another Mollier diagram of $CO_2$ refrigerant of the heat pump cycle system according to the first embodiment.

However, according to the first embodiment of the present invention, the inside heat exchanger 30 includes the first and second heat exchangers 31, 32, and the first inside heat exchanger 31 disposed at the downstream air side of the the second inside heat exchanger 32 is placed on the upstream refrigerant side of the second inside heat exchanger 32 during the heating operation. Thus, it is compared with the single inside heat exchanger, the temperature difference between temperature (Tair) of air passing through the inside heat exchanger 30 and the first and second inside heat exchangers 31, 32 (Th1, Th2) can be maintained in a predetermined range. Accordingly, as shown in FIG. 11, heat quantity (Enthalpy) transmitting to air passing through the inside heat exchanger 30 (Ht) having the first and second inside heat exchangers 31, 32 is increased by δQ as compared with the single heat exchanger (Hs).

Further, according to the first embodiment of the present invention, the control of the expansion valve 50 during the heating operation and the control of the expansion valve 50 during the cooling operation are independently suitably performed. Therefore, even during any one of the heating operation and the cooling operation, the $CO_2$ refrigerant cycle of the heat pump cycle system can be effectively operated.

Figure 12:
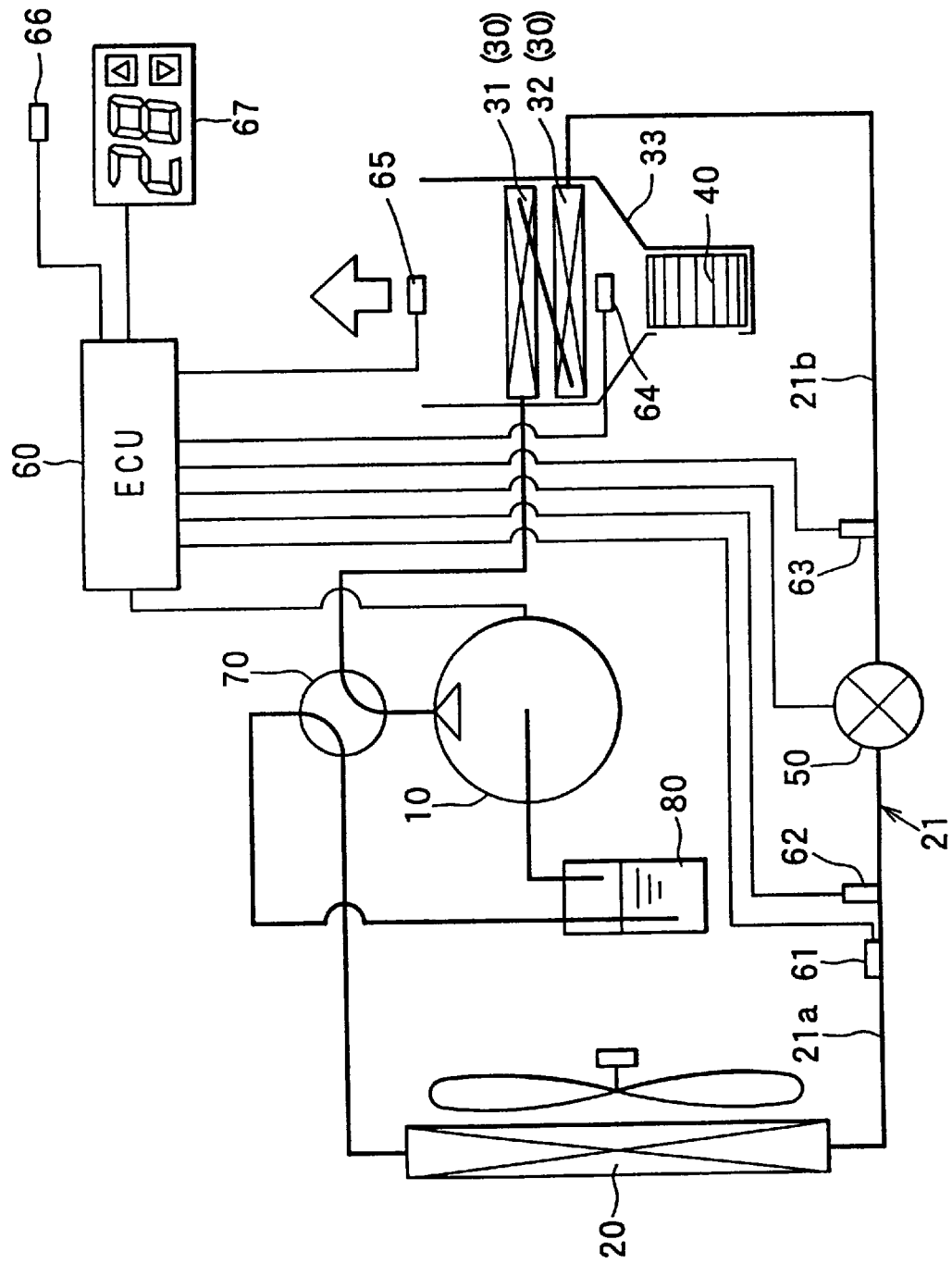
FIG. 12 is a schematic view showing a heat pump cycle system during the heating operation according to a second preferred embodiment of the present invention.
Figure 13:
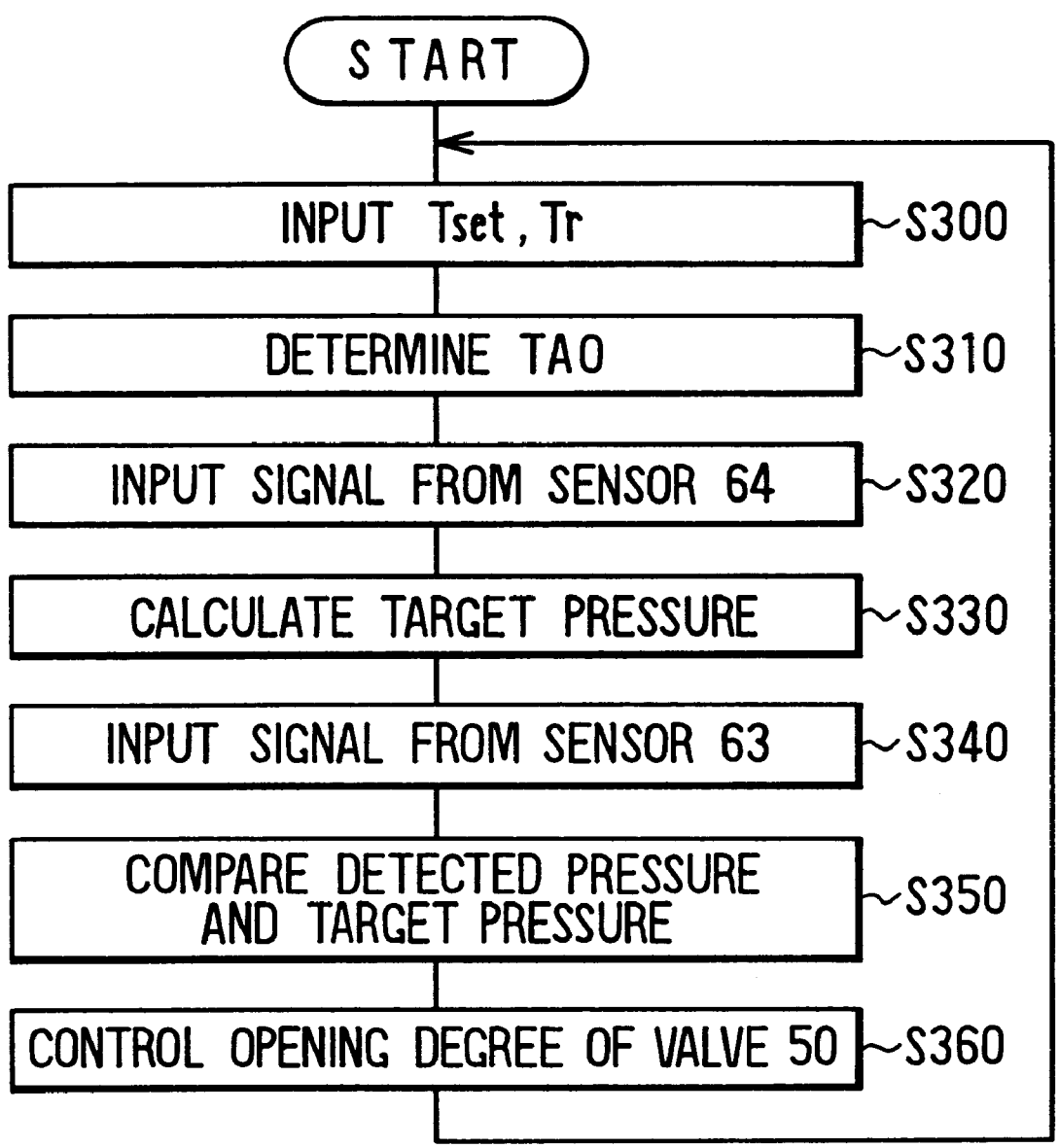
FIG. 13 is a flow diagram for controlling an expansion valve of the heat pump cycle system during the heating operation according to the second embodiment.

A second preferred embodiment of the present invention will be now described with reference to FIGS. 12 and 13. In the above-described first embodiment of the present invention, the target pressure of refrigerant (high-pressure side refrigerant) on the outlet of the inside heat exchanger 30 is determined during the heating operation based on the temperature and the amount (Vb) of air flowing into the inside heat exchanger 30 and the target air temperature (TAO), so that the coefficient of performance of the $CO_2$ refrigerant cycle becomes approximately maximum. In the second embodiment of the present invention, the voltage (Vb) applied to the blower motor of the blower 40 is fixed to a generally usual value so that the amount of air flowing into the inside heat exchanger 30 is set to a generally usual value, and a detector for detecting the voltage (Vb) is omitted, as shown in FIG. 12. That is, the target pressure of refrigerant on the outlet side of the inside heat exchanger 30 during the heating operation is not determined based on the air amount flowing into the inside heat exchanger 30. Thus, in the second embodiment, the control of the expansion valve 50 becomes simple, and control responding performance of the expansion valve 50 can be improved.

Next, the control operation of the expansion valve 50 during heating operation will be described in detail. As shown in FIG. 13, firstly, the set temperature (Tset) set by the temperature setting unit 67 and the temperature (Tr) inside the passenger compartment are input into the ECU 60 at step S300. Next, at step S310, the target air temperature (TAO) of the passenger compartment is determined based on the set temperature (Tset) and the temperature (Tr) inside the passenger compartment. Next, air temperature detected by the second temperature sensor 64 is input into the ECU 60 at step S320, and a target pressure during the heating operation is calculated based on a predetermined map (not shown) at step S330. Further, pressure detected by the second pressure sensor 63 is input at step S340, and the detected pressure and the target pressure of refrigerant are compared at step S350. Next, the opening degree of the expansion valve 50 is controlled based on the detected pressure and the target pressure of refrigerant during the heating operation, at step S360. That is, when the detected pressure of refrigerant is larger than the target pressure of refrigerant, the opening degree of the electric expansion valve 50 is increased so that the pressure of refrigerant discharged from the inside heat exchanger 30 is decreased. On the other hand, when the detected pressure of refrigerant is smaller than the target pressure of refrigerant, the opening degree of the electric expansion valve 50 is decreased so that the pressure of refrigerant discharged from the inside heat exchanger 30 is increased. Further, when the detected pressure of refrigerant is equal to the target pressure of refrigerant, the opening degree of the expansion valve 50 is maintained. Thereafter, the program returns to step S300, and repeats the operations of steps S300–S360.

In the second embodiment of the present invention, the other components are similar to those of the present invention, and the explanation thereof is omitted. Thus, in the second embodiment, the effect similar to those of the above-described first embodiment can be obtained.

A third preferred embodiment of the present invention will be now described with reference to FIGS. 14 and 15. In the above-described first and second embodiments, the control of the expansion valve 50 during the heating operation is performed to be different from the control of the expansion valve 50 during the cooling operation, so that the operation of the heat pump cycle system is suitably controlled. In the third embodiment, the control of the expansion valve 50 during the cooling operation and the control of the expansion valve 50 during the heating operation are performed by using the same control method so that the control of the expansion valve 50 is made simple.

Figure 14:
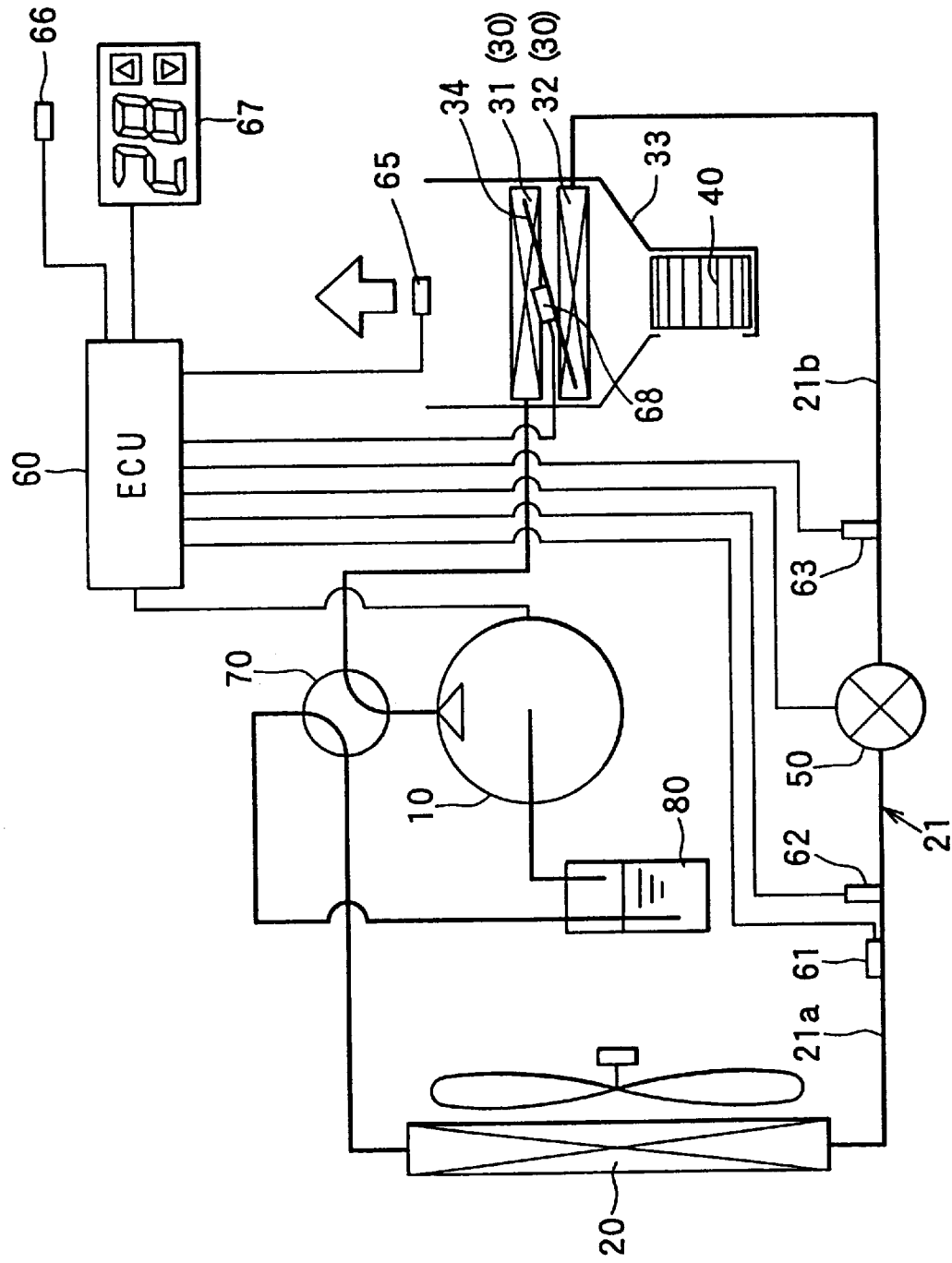
FIG. 14 is a schematic view showing a heat pump cycle system during the heating operation according to a third preferred embodiment of the present invention.

FIG. 14 is a schematic view showing a $CO_2$ refrigerant cycle of a heat pump cycle system according to the third embodiment. As shown in FIG. 14, the second temperature sensor 64 described above is omitted, and a fifth temperature sensor 68 is disposed to detect the temperature of refrigerant flowing in a refrigerant pipe 34 connecting the refrigerant outlet side of the first inside heat exchanger 31 and the refrigerant inlet side of the second inside heat exchanger 32.

Figure 15:
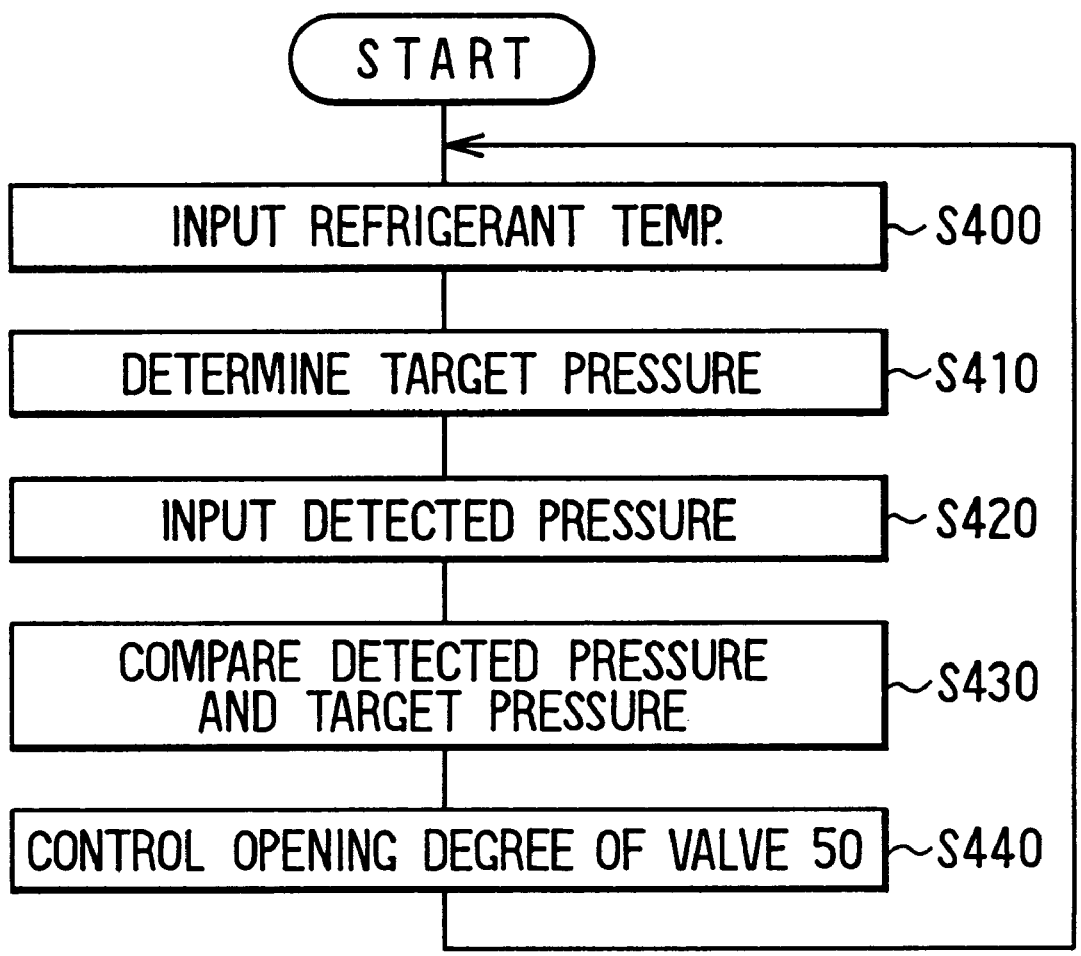
FIG. 15 is a flow diagram for controlling an expansion valve of the heat pump cycle system according to the third embodiment.
Figure 16:
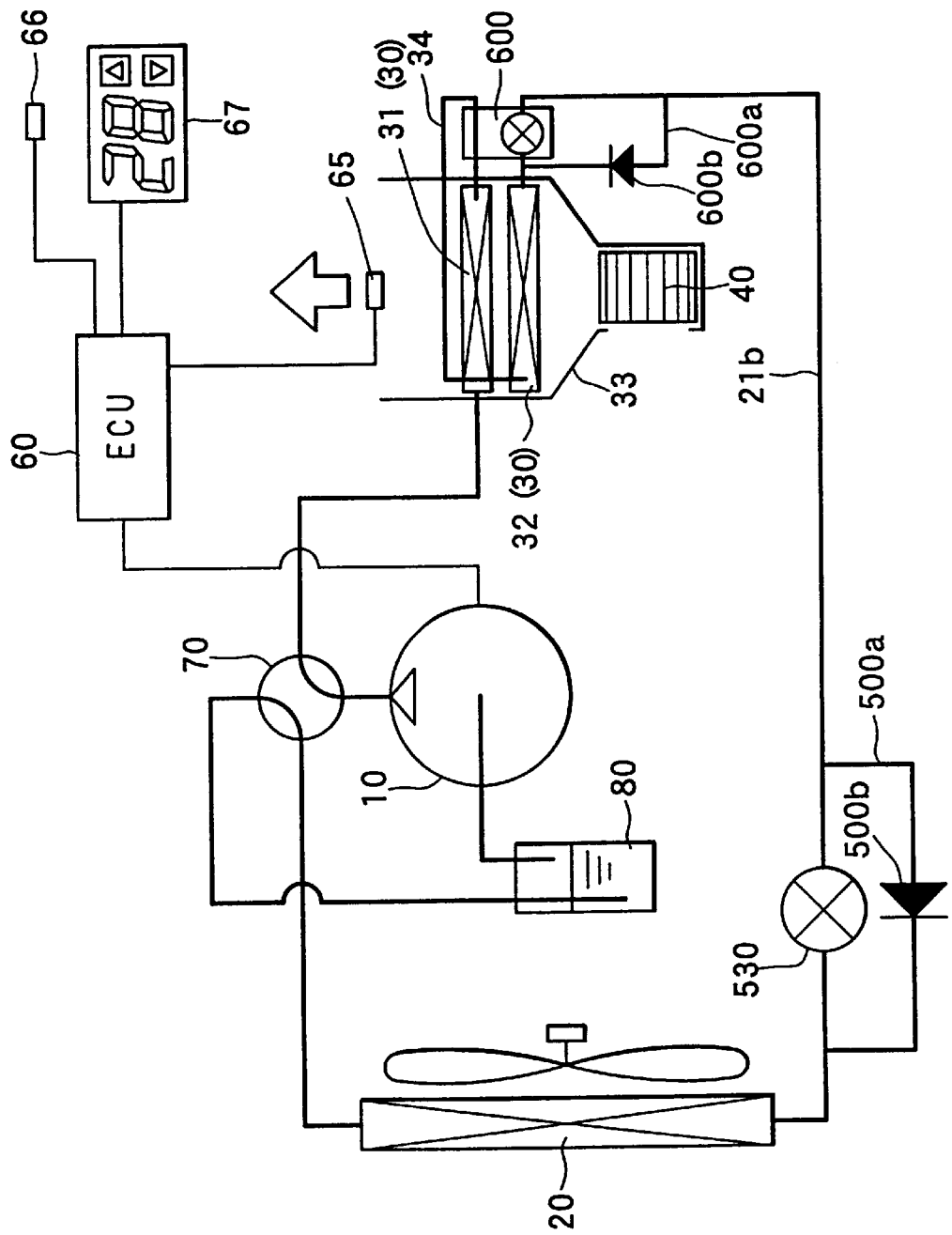
FIG. 16 a schematic view showing a heat pump cycle system during the heating operation according to a fourth preferred embodiment of the present invention.

Here, the control of the expansion valve 50 according to the third embodiment will be now described based on the flow diagram shown in FIG. 15. Firstly, at step S400, refrigerant temperature detected by the first temperature sensor 61 is input during the cooling operation or refrigerant temperature detected by the fifth temperature sensor 68 is input during the heating operation. Next, at step S410, a target pressure is determined based on the relationship between the refrigerant temperature and the refrigerant pressure, shown in FIG. 5, for example. Further, at step S420, the pressure detected by the first pressure sensor 62 is input during the cooling operation, and the pressure detected by the second pressure sensor 63 is input during the heating operation. Thereafter, the detected pressure and the target pressure are compared at step S430, and the opening degree of the expansion valve is controlled according to the detected pressure and the target pressure. That is, when detected pressure is larger than the target pressure, the opening degree of the expansion valve 50 is increased. Therefore, the pressure of refrigerant discharged from the inside heating heat exchanger 30 is decreased during heating operation, and the pressure of refrigerant discharged from the outside heat exchanger 20 is decreased during the cooling operation. On the other hand, when detected pressure is smaller than the target pressure, the opening degree of the expansion valve 50 is decreased. Therefore, the pressure of refrigerant discharged from the inside heating heat exchanger 30 is increased during the heating operation, and the pressure of refrigerant discharged from the outside heat exchanger 20 is increased during the cooling operation, in the heat pump cycle system. Thereafter, the program returns to step S400, and repeats steps S400–S440.

According to the third embodiment of the present invention, the high pressure side of the heat pump cycle system indicates the refrigerant side of the outside heat exchanger 20 during the cooling operation, and indicates the refrigerant side of the inside heat exchanger 30 during the heating operation. Therefore, the temperature of refrigerant on the inlet side of the expansion valve 50 during the cooling operation is not equal to that during the heating operation. That is, during the cooling operation, the temperature of the inlet side of the expansion valve 50 is the temperature of refrigerant on the outlet side of the outside heat exchanger 20. On the other hand, during the heating operation, the temperature of the inlet side of the expansion valve 50 is the temperature of refrigerant on the outlet side of the inside heat exchanger 30. Thus, during the cooling operation, the temperature of refrigerant on the inlet side of the expansion valve 50 is equal to or higher than the outside air temperature when the outside air temperature is high in the summer. Further, during the heating operation, the temperature of refrigerant on the inlet side of the expansion valve 50 is equal to or higher than the inside air temperature of the passenger compartment when the outside air temperature is low in the winter. Thus, the temperature of refrigerant on the inlet side of the expansion valve 50 becomes lower during the heating operation, than that during the cooling operation.

If the control of the expansion valve 50 is performed to be simply equal during the cooling operation and the heating operation, the pressure of refrigerant on the inlet side of the expansion valve 50 during the heating operation becomes lower than that during the cooling operation. Therefore, during the heating operation, the heating capacity of the inside heat exchanger 30 is decreased.

However, according to the third embodiment of the present invention, because the temperature of refrigerant between the first inside heat exchanger 31 and the second heat exchanger 32 is detected by the fifth temperature sensor 68 during the heating operation, the refrigerant temperature detected by the fifth temperature sensor 68 is higher than the refrigerant temperature on the inlet side of the expansion valve 50. Thus, even when the control of the expansion valve 50 during the heating operation is performed to be equal to that during the cooling operation, the $CO_2$ refrigerant cycle of the heat pump cycle system can be controlled so that the discharge pressure of the compressor 10 becomes higher during the heating operation. As a result, in the heat pump cycle system of the third embodiment, the control of the expansion valve 50 can be made simple, while both of the coefficient of performance of the $CO_2$ refrigerant cycle and the heating capacity are improved during the heating operation.

A fourth preferred embodiment of the present invention will be now described with reference to FIGS. 16–19. In the above-described first to third embodiments, the expansion valve 50 is used. In the fourth embodiment, instead of the expansion valve 50, mechanical expansion valves 500, 600 are used in a heat pump cycle system. During the heating operation, the expansion valve 600 controls the refrigerant pressure on the outlet side of inside heat exchanger 30 based on the temperature of refrigerant between the refrigerant outlet side of the first inside heat exchanger 31 and the refrigerant inlet side of the second inside heat exchanger 32, and reduces the pressure discharged from the inside heat exchanger 30 (i.e., the second heat exchanger 32). On the other hand, during the cooling operation, the expansion valve 500 controls the refrigerant pressure on the outlet side of the outside heat exchanger 20 based on the temperature of refrigerant on the outlet side of the outside heat exchanger 20, and reduces the pressure of refrigerant discharged from the outside heat exchanger 20.

During the heating operation, refrigerant bypasses the expansion valve 500 through a bypass passage 500a. A check valve 500b is disposed in the bypass passage 500a, so that the check valve 500b prevents refrigerant from bypassing the expansion valve 500 during the cooling operation. Similarly, during the cooling operation, refrigerant bypasses the expansion valve 600 through a bypass passage 600a. A check valve 600b is disposed in the bypass passage 600a, so that the check valve 600b prevents refrigerant from bypassing the expansion valve 600 during the heating operation.

Figure 17:
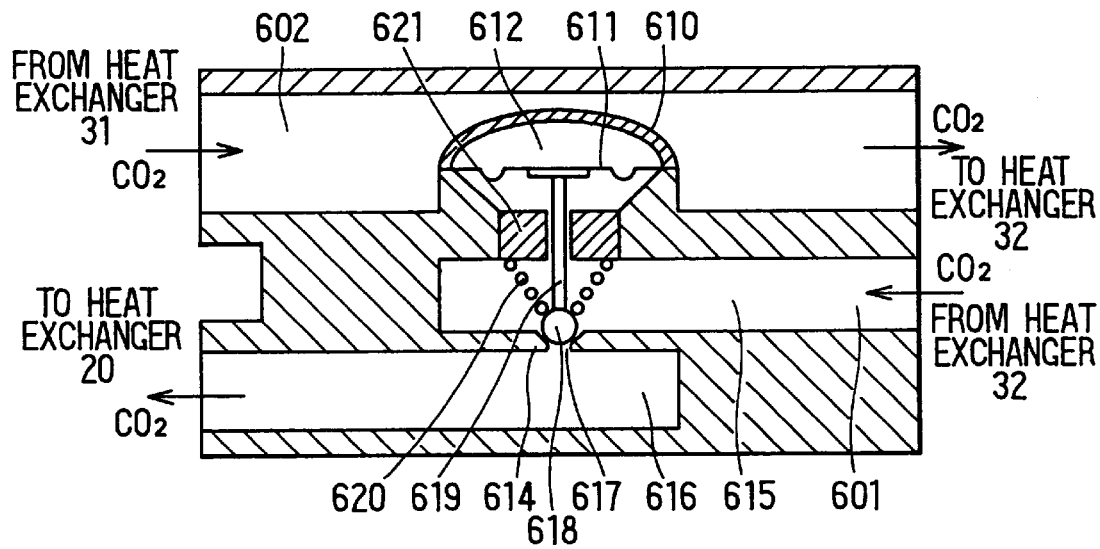
FIG. 17 is a schematic view showing an expansion valve of the heat pump cycle system according to the fourth embodiment.

FIG. 17 shows a schematic view of the expansion valve 600. As shown in FIG. 17, a sealed space 612 is formed by a spherical-surface valve cover 610 and a diaphragm 611. $CO_2$ refrigerant is sealed within the sealed space 612 by a density of about 600 kg/m³ when a valve port 617 is closed. A refrigerant passage 602 of the expansion valve 600 forms a part of the refrigerant passage of the refrigerant pipe 34. The refrigerant pressure within the sealed space 612 is changed by sensing the temperature of refrigerant flowing through the refrigerant pipe 34 between the refrigerant outlet of the first inside heat exchanger 31 and the refrigerant inlet of the second inside heat exchanger 32.

A refrigerant inlet side space 615 and a refrigerant outlet side space 616 of the expansion valve 600 are partitioned by a partition wall portion 614, and the valve port 617 through which both spaces 615, 616 communicate with each other is formed in the partition wall portion 614. An opening degree of the valve port 617 is adjusted by a valve body 618 which is mechanically operatively linked with a movement of the diaphragm 611.

The pressure within the sealed space 612 is applied to the valve body 618 in a direction for closing the valve port 617, and elastic pressure of a coil spring 620 is applied to the valve body 618 in the direction for closing the valve port 617. Therefore, the opening degree of the valve port 617 is determined by a difference between a force due to the pressure within the refrigerant inlet side space 615 and the sum of the elastic force of the coil spring 620 and a force due to the pressure of the sealed space 612.

An initial load of the coil spring 620 is adjusted by a spacer 621, so that a predetermined initial load applied to the valve body 618 is adjusted by the spacer 621. In the fourth embodiment of the present invention, the initial load of the coil spring 620 is about 1 MPa when being calculated by the pressure of the diaphragm 611.

Figure 18:
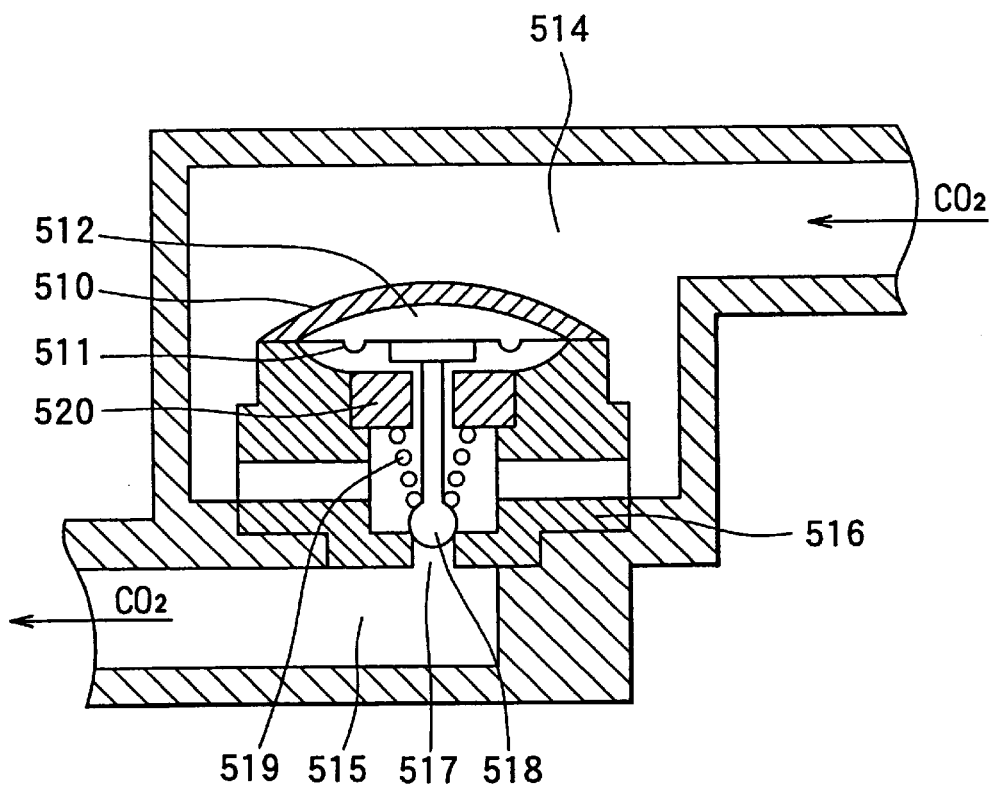
FIG. 18 is a schematic view showing an another expansion valve of the heat pump cycle system according to the fourth embodiment.
Figure 19:
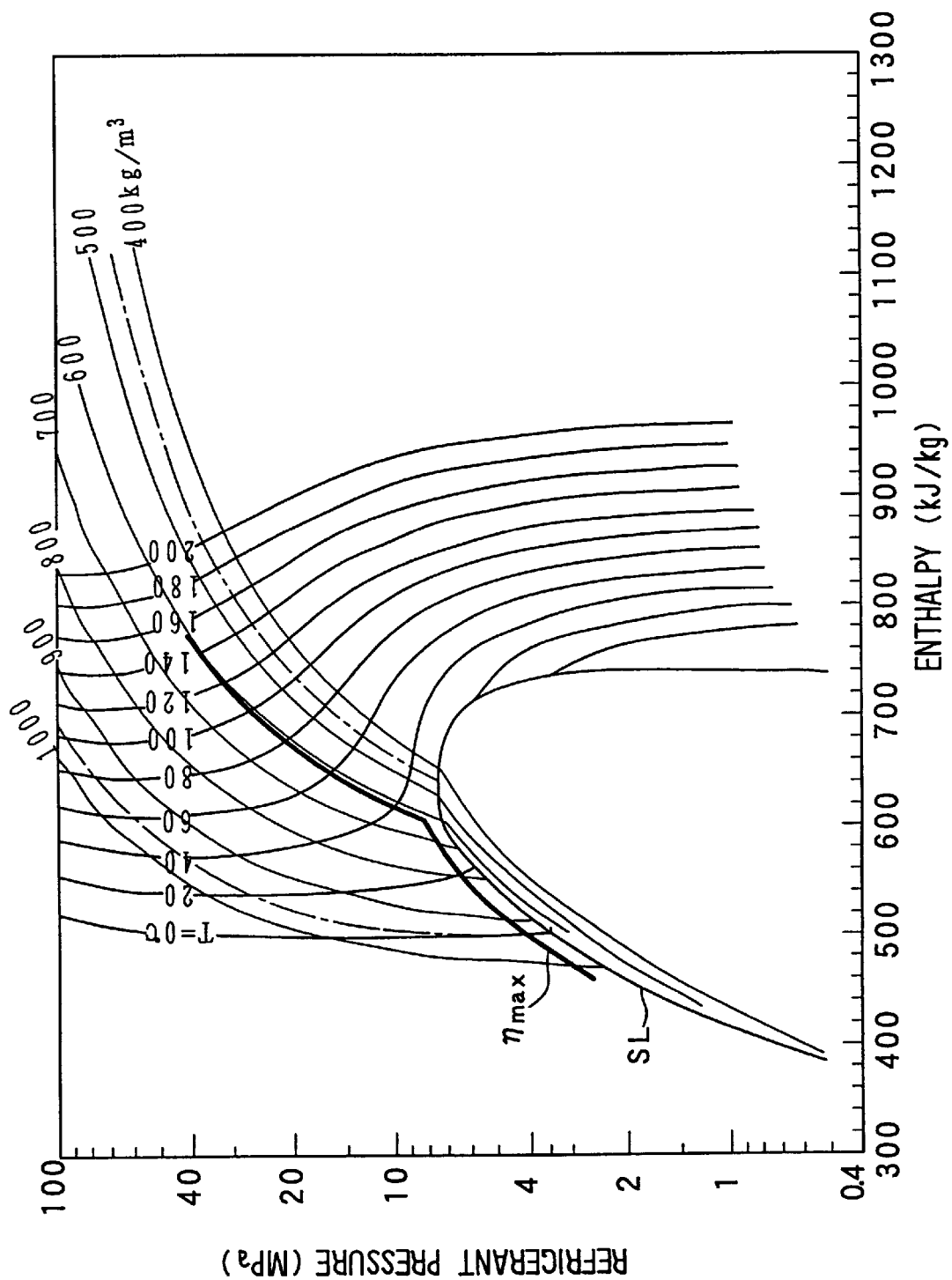
FIG. 19 is a Mollier diagram of $CO_2$ refrigerant of the heat pump cycle system according to the fourth embodiment.

FIG. 18 is a schematic view of the mechanical expansion valve 500. The structure of the expansion valve 500 is similar to that of the expansion valve 600, except for the refrigerant passage 602 forming a part of the refrigerant pipe 34. That is, as shown in FIG. 18, a sealed space 512 is formed by a spherical-surface valve cover 510 and a diaphragm 511. $CO_2$ refrigerant is sealed within the sealed space 512 by a density of about 600 kg/m³ when a valve port 517 is closed. A refrigerant inlet side space 514 and a refrigerant outlet side space 515 of the expansion valve 500 are partitioned by a partition wall portion 516, and a valve port 517 through which both spaces 514, 515 communicate with each other is formed in the partition wall portion 514. An opening degree of the valve port 517 is adjusted by a valve body 518 which is mechanically operatively linked with a movement of the diaphragm 511.

The pressure within the sealed space 512 is applied to the valve body 518 in a direction for closing the valve port 517, and elastic force of a coil spring 519 is applied to the valve body 518 in the direction for closing the valve port 517. Therefore, the opening degree of the valve port 517 is determined by a difference between a force due to the pressure within the space 514 and the sum of the elastic force of the coil spring 519 and a force due to the pressure of the sealed space 512.

An initial load of the coil spring 520 is adjusted by a spacer 520, so that a predetermined initial load applied to the valve body 518 is adjusted by the spacer 520.

The operation of the mechanical expansion valve 500 is similar to that of the mechanical expansion valve 600. Therefore, only the expansion valve 600 will be now described. In the fourth embodiment of the present invention, $CO_2$ refrigerant is sealed within the sealed space 612 by about 600 kg/m³. Therefore, the pressure and temperature of the sealed space 612 are changed along the isopycnic line of 600 kg/m³ in FIG. 19. Therefore, when the temperature within the sealed space 612 is 20° C., for example, the pressure within the sealed space 612 is approximately 5.8 MPa. Further, because the pressure within the sealed space 612 and the initial load of the coil spring 620 are simultaneously applied to the valve body 618, the force applying to the valve body 618 is approximately 6.8 MPa. Thus, when the pressure of the space 615 is smaller than 6.8 MPa, the valve port 617 is closed by the valve body 618. On the other hand, when the pressure of the space 615 is larger than 6.8 MPa, the valve port 617 is opened by the valve body 618.

Similarly, when the temperature within the sealed space 612 is 40° C., for example, the pressure within the sealed space 612 is approximately 9.7 MPa. Further, because the pressure within the sealed space 612 and the initial load of the coil spring 620 are simultaneously applied to the valve body 618, the force applying to the valve body 618 is approximately 10.7 MPa. Thus, when the pressure of the space 615 is equal to or smaller than 10.7 MPa, the valve port 617 is closed by the valve body 618. On the other hand, when the pressure of the space 615 is larger than 10.7 MPa, the valve port 617 is opened by the valve body 618.

According to the fourth embodiment of the present invention, the relationship between the refrigerant temperature and the refrigerant pressure on the isopycnic line of 600 kg/m³ in the critical area approximately corresponds to the graph shown in FIG. 5. Therefore, during the cooling operation, the expansion valve 500 controls the discharge pressure of the compressor 10 while the $CO_2$ refrigerant operates with a sufficient coefficient of performance. Under the critical pressure, the isopycnic line of 600 kg/m³ is greatly shifted from the graph of FIG. 5. That is, because this case is in a condensing area of refrigerant, the inner pressure of the sealed space 612 is changed along the saturation liquid line SL in FIG. 19. Further, because the initial load is applied to the valve body 618 by the coil spring 620, the $CO_2$ refrigerant cycle is controlled by the solid line ηmax in FIG. 19, having a super-cooling degree about 10° C. Thus, even the pressure of $CO_2$ refrigerant is lower than the critical pressure, the $CO_2$ refrigerant cycle can be effectively controlled.

On the other hand, during the heating operation, the pressure of refrigerant discharged from the inside heat exchanger 30 can be controlled based on a refrigerant temperature higher than that during the cooling operation, similarly to that of the third embodiment. Therefore, the cooling operation and the heating operation can be controlled by the expansion valves 500, 600 having the same structure. Accordingly, the heat pump cycle system of the fourth embodiment can improve both of the heating capacity and coefficient of performance of the $CO_2$ refrigerant cycle by using the expansion valves 500, 600.

Further, the pressure of refrigerant on the outlet side of the inside heat exchanger 30 (i.e., second inside heat exchanger 32) can be controlled based on the refrigerant temperature in the refrigerant pipe 34 between the first and second inside heat exchangers 31, 32. Therefore, it is possible to reduce the refrigerant density sealed in the sealed space 612, thereby preventing the inner pressure of the sealed space 612 from being excessively increased and preventing the diaphragm 611 from being damaged. However, by increasing the refrigerant density sealed in the sealed space 612 of the expansion valve 600 than that of the expansion valve 500, the pressure of refrigerant on the outlet side of the inside heat exchanger 30 (i.e., second inside heat exchanger 32) during the heating operation may be controlled based on the refrigerant temperature on the outlet side of the second inside heat exchanger 32.

Figure 20:
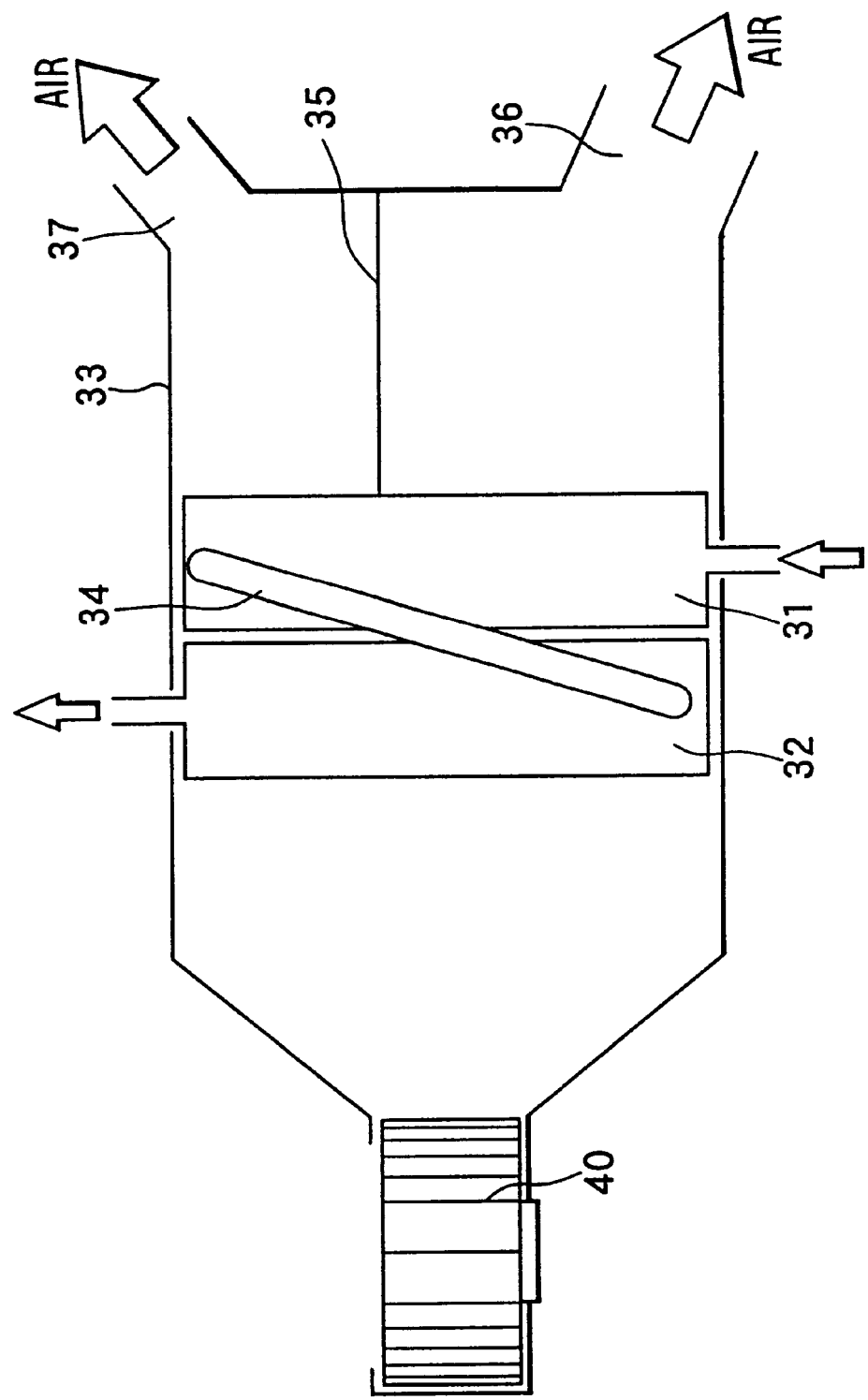
FIG. 20 is a schematic view of an air conditioner according to a fifth preferred embodiment of the present invention.

A fifth preferred embodiment of the present invention will be now described with reference to FIG. 20. In the fifth embodiment, the ununiform temperature distribution of the inside heat exchanger 30 during the heating operation is mainly used. That is, as shown in FIG. 20, a partition plate 35 is disposed within the air-conditioning case 33 so that a downstream air side passage of the first inside heat exchanger 31 is partitioned into plural air passages (e.g., two air passages in the fifth embodiment). Further, a first air outlet 36 for blowing air toward the foot area of a passenger in the passenger compartment is formed in the air-conditioning case 33 at a position where high-temperature air from the inside heat exchanger 30 flows, and a second air outlet 37 for blowing air toward the upper area of the passenger in the passenger compartment is formed in the air-conditioning case 33 at a position where low-temperature air from the inside heat exchanger 30 flows.

Figure 21A:
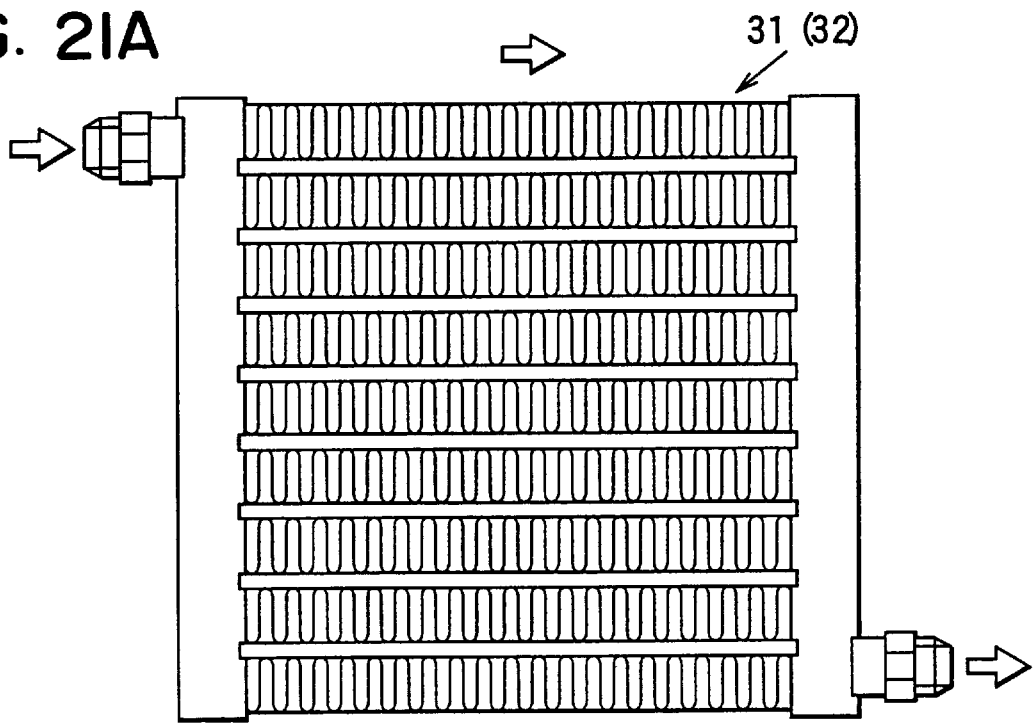
FIGS. 21A, 21B are schematic front views each showing an inside heat exchanger according to a sixth preferred embodiment of the present invention.
Figure 21B:
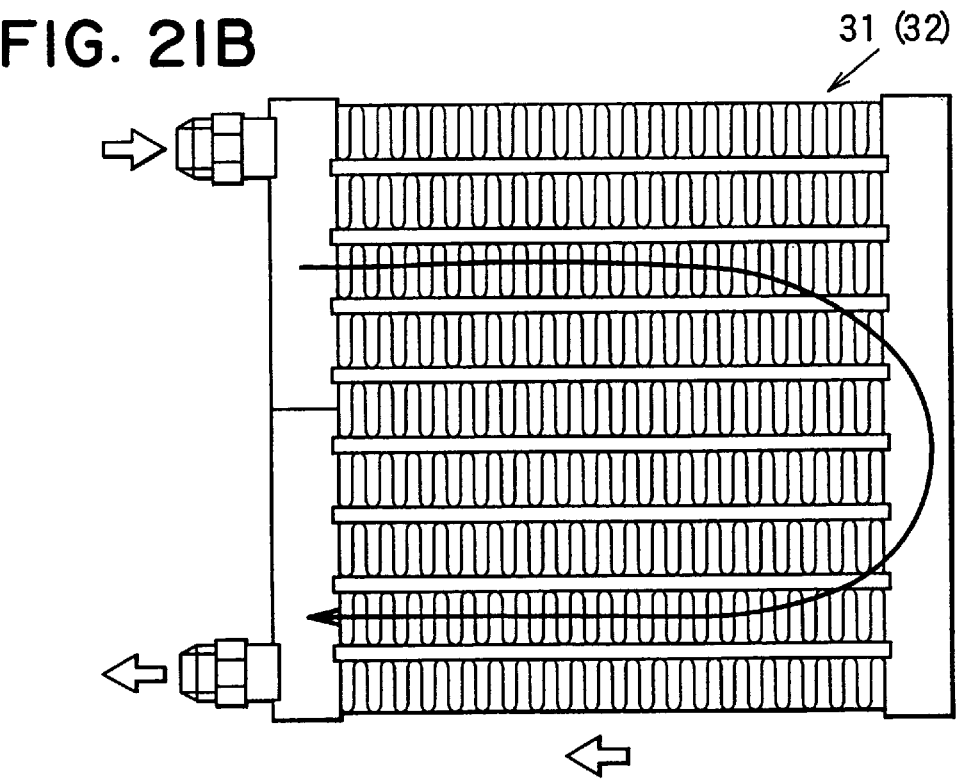

A sixth preferred embodiment of the present invention will be now described with reference to FIGS. 21A, 21B. In the above-described embodiments of the present invention, each of the first and second inside heat exchangers 31, 32 is one-way type in which refrigerant flows in one way, as shown in FIG. 21A. In the sixth embodiment of the present invention, each of the first and second inside heat exchangers 31, 32 is a U-turn type in which refrigerant flows in a U-shape, as shown by the solid line in FIG. 21B.

A seventh preferred embodiment of the present invention will be now described with reference to FIGS. 22–26. In the seventh embodiment of the present invention, the opening degree of the expansion valve 50 is controlled so that the target pressure of refrigerant (high-pressure side refrigerant) discharged from the compressor 10 during the heating operation becomes in a range of 9 MPa–11 MPa. On the other hand, during the cooling operation, the target pressure of refrigerant (high-pressure side refrigerant) discharged from the compressor 10 is controlled similarly to the above-described first embodiment.

Here, the reason why the target pressure of refrigerant discharged from the compressor 10 is set in a range of 9 MPa–11 MPa during the heating operation will be now described. During the heating operation, because the outside heat exchanger 20 is used as an evaporator, the pressure of refrigerant (i.e., low-pressure side refrigerant) in the outside heat exchanger 20 is decreased in accordance with a decrease of the outside air temperature (Tout). For example, when the outside air temperature (Tout) is approximately −20° C., the pressure of refrigerant in the outside heat exchanger 20 is approximately 1.6 MPa. Thus, during the heating operation, the compressor 10 is need to be operated with a compression ratio about 7. Here, the compression ratio is a ratio of a pressure of the high-pressure side refrigerant to a pressure of the low-pressure side refrigerant. The compression ratio about 7 during the heating operation is larger than the compression ratio during the cooling operation. During the cooling operation, the compression ratio is approximately equal to or lower than 4.

Figure 22:
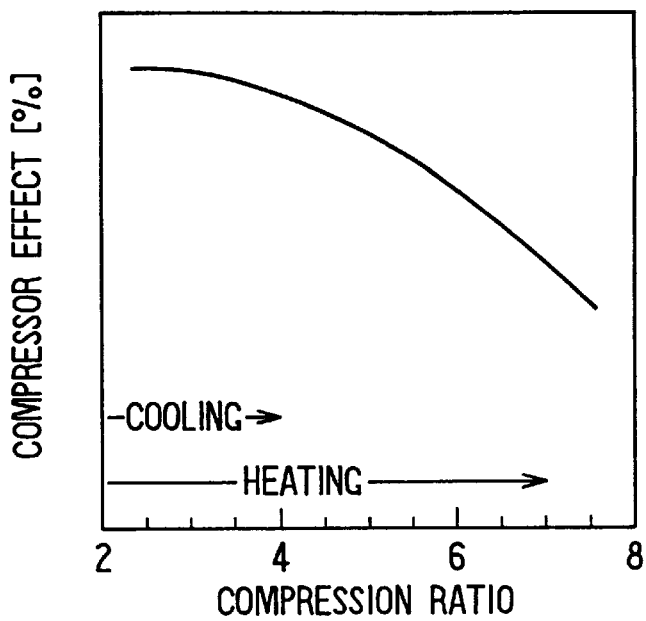
FIG. 22 is a graph showing the relationship between a compressor effect and a compression ratio according to a seventh preferred embodiment of the present invention.

FIG. 22 shows the relationship between the compression ratio and compressor effect. The compressor effect is the product of the full insulation effect of the compressor 10 and the motor effect of the electrical motor for driving the compressor 10. As shown in FIG. 22, the compressor effect is decreased as the compression ratio becomes larger. The full insulation effect of the compressor 10 is a ratio of an output power from the compressor 10 to an input power of the compressor 10 when the compressor 10 performs a heat-insulation compression. Generally, the full insulation effect of the compressor 10 is equal to 1 or lower than 1.

Further, when the outside air temperature is in a range of −10° C. −−20° C. during the heating operation, the pressure of the low-pressure side refrigerant becomes lower than that during the cooling operation. Therefore, during the heating operation, even when the pressure of the high-pressure side refrigerant is changed similarly to that of the cooling operation, the compression ratio is changed greatly as compared with the compression ratio during the cooling operation. Therefore, during the heating operation, the compressor effect relative to a change of the pressure of the high-pressure side refrigerant is greatly changed as compared with the cooling operation. Thus, the coefficient (COP) of performance of the $CO_2$ refrigerant cycle during the heating operation is readily affected by the compressor effect, as compared with that during the cooling operation.

Next, the maximum value of the coefficient (COP) of performance determined from the $CO_2$ refrigerant cycle will be now described. Generally, in the vehicle air conditioner, an air-conditioning operation is performed by mixing a predetermined amount of outside air (i.e., air outside the passenger compartment) into inside air (i.e., air inside the passenger compartment), so that a windshield is prevented from being frosted during the heating operation. Therefore, temperature of air flowing into the inside air heat exchanger 30 is relative to the temperature of inside air and the temperature of outside air. Here, for simply explaining the affect of outside air temperature, it is assumed in that the temperature of inside air is constant and the temperature of air flowing into the inside heat exchanger 30 is changed in accordance with the temperature of outside air. Further, it is assumed in that the temperature of air blown into the passenger compartment and the amount of air blown into the passenger compartment are constant relative to a predetermined temperature of outside air. In the above-described assumed condition of the heating operation, locus L1 showing a change of the pressure of refrigerant at the inlet side of the inside heat exchanger 30 and locus L2 showing a change of pressure of refrigerant on the outlet side of the inside heat exchanger 30 are indicated on the Mollier diagram of FIG. 23. As shown by the locus L1 in FIG. 23, as the pressure of refrigerant on the inlet side of the inside heat exchanger 30 becomes higher, the compression amount of the compressor 10 is increased, and the Enthalpy of refrigerant on the inlet side of the inside heat exchanger 30 (i.e., radiator) becomes higher. On the other hand, as shown by the locus L2 in FIG. 23, the enthalpy of refrigerant on the outlet side of the inside heat exchanger 30 (i.e., radiator) becomes larger as the pressure of high-pressure side refrigerant becomes lower, and the enthalpy of refrigerant on the outlet side of the inside heat exchanger 30 (i.e., radiator) becomes smaller as the pressure of high-pressure side refrigerant becomes higher.

Figure 23:
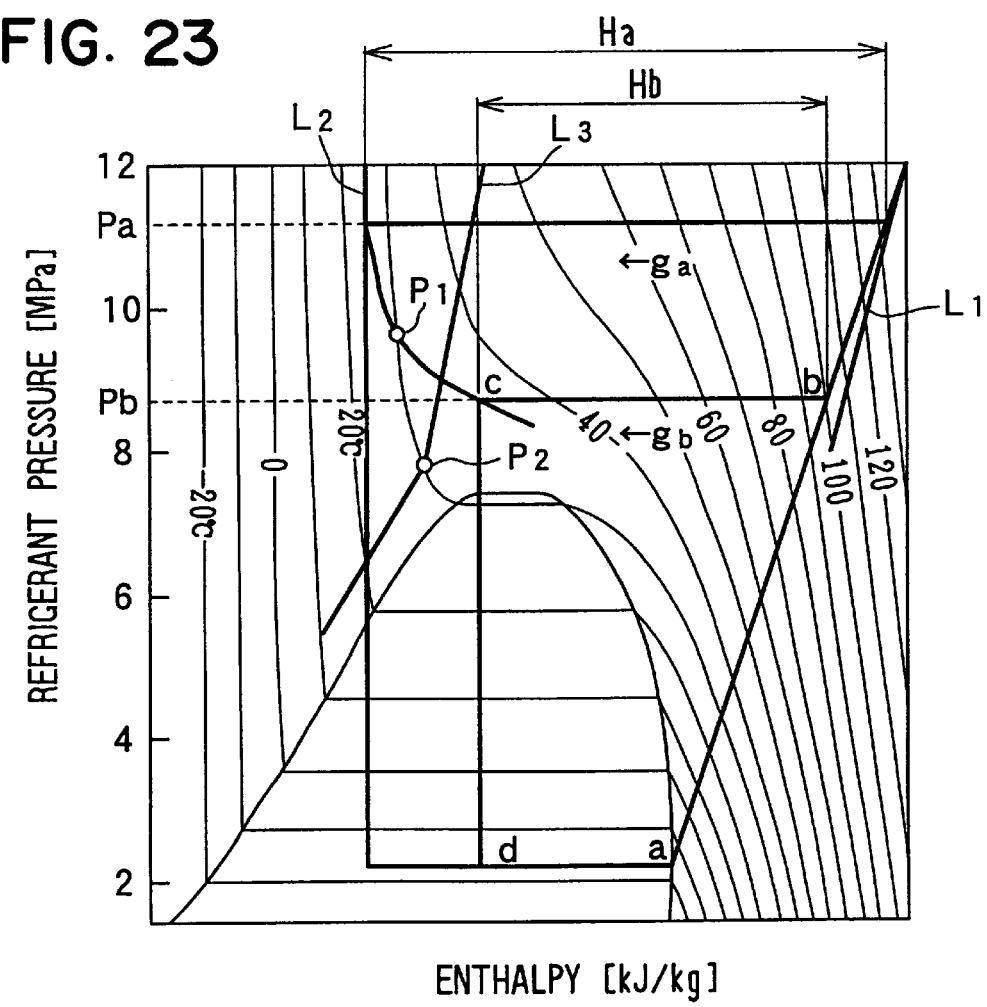
FIG. 23 is a Mollier diagram of $CO_2$ refrigerant of a heat pump cycle system according to the seventh embodiment.

That is, as shown by a-b-c-d line of FIG. 23, when the $CO_2$ refrigerant cycle is in the condition where an enthalpy difference of refrigerant between the inlet and the outlet of the inside heat exchanger 30 is Hb (J/kg), a circulating refrigerant flow amount is gb (kg) and the pressure of high-pressure side refrigerant is Pb (MPa), the $CO_2$ refrigerant cycle is referred to as "cycle b". When the pressure of the high-pressure side refrigerant is increased from the Pb (MPa) to Pa (MPa) from the cycle b, the enthalpy difference of refrigerant between the inlet and the outlet of the inside heat exchanger 30 is increased to Ha (J/kg), and refrigerant circulating amount is changed from the amount gb (kg/sec) to the amount ga (kg/sec). This state is referred to as "cycle a".

In this case, because the temperature of air blown into the passenger compartment is constant, that is, because the heating capacity for the passenger compartment is supposed to be constant, the relationship of Hb×gb=Ha×ga may be obtained. Further, the temperature of air blown into the passenger compartment is supposed to be constant, the mean temperature of the inside heat exchanger 30 becomes constant, without being changed with a change of the pressure of the high-pressure side refrigerant. When the pressure of the high-pressure side refrigerant is increased, the temperature of refrigerant on the inlet side of the inside heat exchanger 30 is increased. Therefore, in the "cycle a", the temperature of refrigerant on the outlet side of the inside heat exchanger 30 is decreased as compared with the "cycle b", and the enthalpy of refrigerant on the outlet side of the inside heat exchanger 30 becomes larger as the pressure of high-pressure side refrigerant becomes lower.

Further, the locus L2 showing the pressure change of refrigerant on the outlet side of the inside heat exchanger 30 is a bent line protruding downwardly, as shown in FIG. 22. Therefore, at the inflection point PI of the locus L2 during the heating operation, the coefficient (COP) of performance of the $CO_2$ refrigerant cycle becomes maximum.

In FIG. 23, the locus L3 shows the most suitable control line during the cooling operation. As shown in FIG. 23, even when the temperature of refrigerant on the outlet side of the inside heat exchanger 30 is constant, the pressure point P2 where the coefficient of performance of the $CO_2$ refrigerant cycle becomes maximum during the cooling operation is different from the pressure point P1 where the coefficient of performance of the $CO_2$ refrigerant cycle becomes maximum during the heating operation.

Actual coefficient (i.e., actual COP) of performance of the $CO_2$ refrigerant cycle is determined by the product of the coefficient (i.e., cycle COP) of performance determined from the state of the $CO_2$ refrigerant cycle in FIG. 23 and the compressor effect in FIG. 22.

Figure 24:
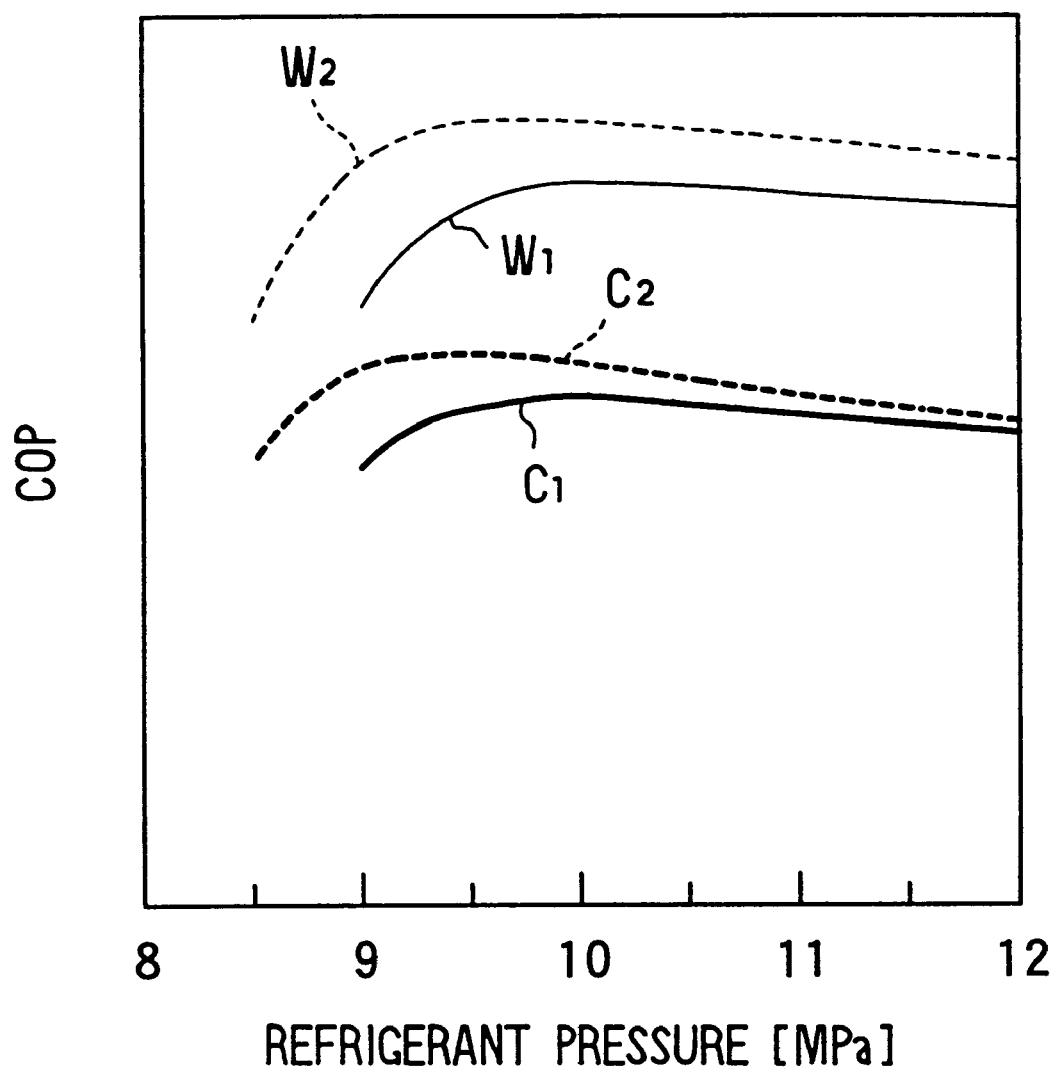
FIG. 24 is a graph showing the relationship between coefficient (COP) of performance of the heat pump cycle system and a refrigerant pressure on an inlet (high-pressure side) of an inside heat exchanger, according to the seventh embodiment.

In FIG. 24, the solid line C1 shows the actual COP, when the temperature of outside air is −10° C., the temperature of inside air is 25° C. and the temperature of air blown from the inside heat exchanger 30 is 50° C. Further, the chain line C2 shows the actual COP, when the temperature of outside air is −10° C., the temperature of inside air is 25° C. and the temperature of air blown from the inside heat exchanger 30 is 45° C. On the other hand, the solid line W1 shows the cycle COP without adding the compressor effect, when the temperature of outside air is −10° C., the temperature of inside air is 25° C. and the temperature of air blown from the inside heat exchanger 30 is 50° C. Further, the chain line W2 shows the cycle COP without adding the compressor effect, when the temperature of outside air is −10° C., the temperature of inside air is 25° C. and the temperature of air blown from the inside heat exchanger 30 is 45° C.

As shown in FIG. 24, in a low pressure area where the pressure of high-pressure side refrigerant is lower than a pressure where the actual COP becomes maximum, the compressor effect of the compressor 10 is large, and the actual COP is slowly decreased in the low pressure area as compared with the cycle COP. On the other hand, in a high pressure area where the pressure of high-pressure side refrigerant is higher than the pressure where the actual COP becomes maximum, the compressor effect is decreased, and the actual COP is greatly decreased in the high pressure area as compared with the cycle COP.

To increase the temperature of air blown into the passenger compartment, it is necessary to increase the mean temperature of the inside heat exchanger 30 (radiator). Therefore, in this case, the temperature of refrigerant on the outlet side of the inside heat exchanger 30 becomes higher, and the locus L2 showing the change of refrigerant on the outlet side of the inside heat exchanger 30 is moved toward a high temperature side. Thus, during the heating operation, the pressure of refrigerant, where the actual COP become maximum during the heating operation, is increased with the movement of the locus L2.

Next, the change of the temperature of outside air and the change of the actual COP will be now described. When the temperature of outside air becomes lower during the heating operation, the temperature of the outside heat exchanger 20 (i.e., evaporator) becomes lower. In this case, because the compression ratio of the compressor 10 becomes larger as the temperature of outside air becomes lower, the compressor effect is lowered.

On the other hand, when the temperature of air flowing into the inside heat exchanger 30 becomes lower, the temperature of air blown from the inside heat exchanger 30 is also lowered. Here, because the temperature of air blown from the inside heat exchanger 30 is set approximately constant, the temperature of refrigerant on the inlet side of the inside heat exchanger 30 is increased so that the decrease of temperature of air blown from the inside heat exchanger 30 is prevented. At this time, even when the temperature of refrigerant on the inlet side of the inside heat exchanger 30 is increased, the temperature of refrigerant on the outlet side of the inside heat exchanger 30 (radiator) becomes lower because the temperature of air flowing into the inside heat exchanger 30 is low. Thus, the mean temperature of the inside heat exchanger 30 can be maintained at an approximate constant value. As a result, the pressure of high-pressure side refrigerant, where the cycle COP become maximum, is decreased as the temperature of outside air is lowered.

Figure 25:
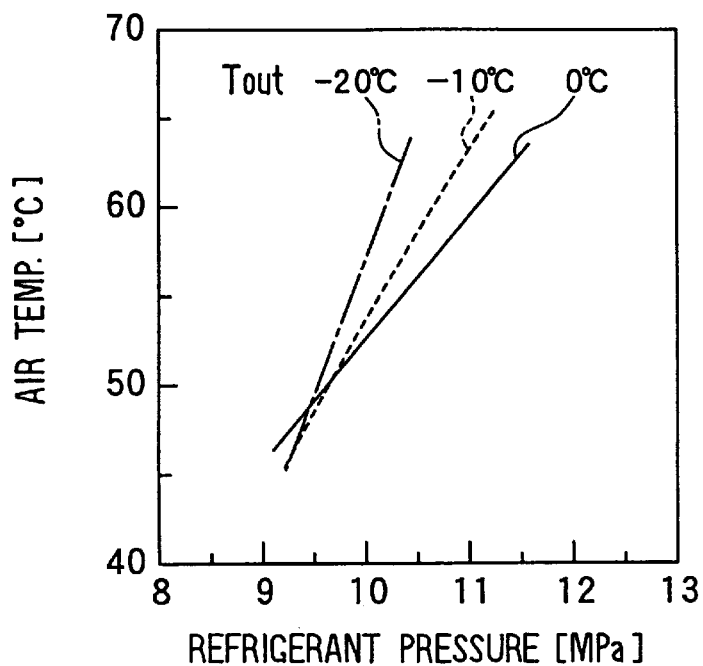
FIG. 25 is a graph showing the relationship between temperature of air blown from the inside heat exchanger, outside air temperature and the refrigerant pressure on the inlet of the inside heat exchanger, according to the seventh embodiment.

FIG. 25 shows the relationships between the temperature of air blown from the inside heat exchanger 30 and the pressure of high-pressure side refrigerant where the actual COP becomes maximum, when the temperature (Tout) of outside air is 0° C., −10° C. and −20° C. In FIG. 25, the temperature of inside air is set at a constant temperature of 25° C., and the total air amount is made constant. Here, a ratio of the amount of outside air to the total air amount is ¼, and a ratio of the amount of inside air to the total air amount is ¾. Further, FIG. 26 shows the relationships between the temperature of air blown from the inside heat exchanger 30 and the pressure of high-pressure side refrigerant where the actual COP can be set to a value lower than the maximum value in a range of 3% of the maximum value, when the temperature of outside air is 0° C., −10° C. and −20° C.

Figure 26:
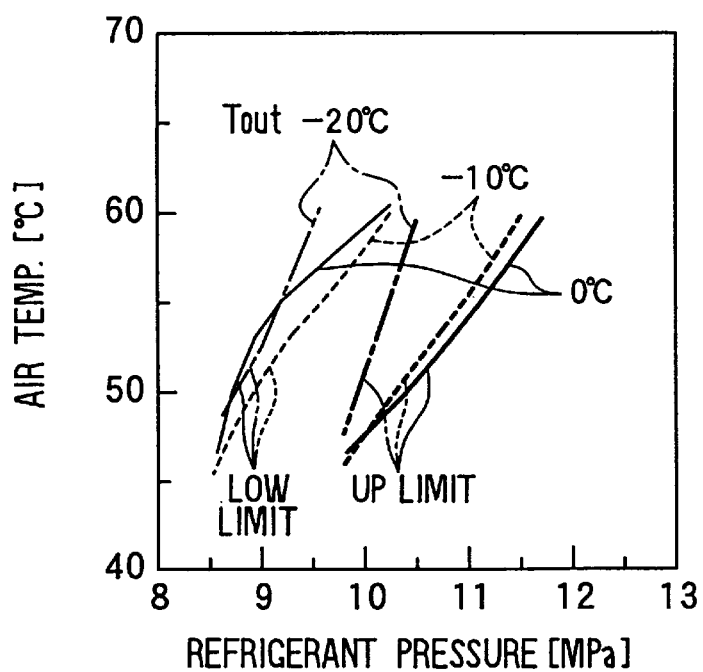
FIG. 26 is a graph showing the relationship between the temperature of air blown from the inside heat exchanger, the outside air temperature and the refrigerant pressure on the inlet of the inside heat exchanger, when the coefficient of performance is decreased from the maximum value by 3%, according to the seventh embodiment.

As shown in FIGS. 25, 26, during the heating operation, when the target pressure of refrigerant (high-pressure side refrigerant) on the inlet side of the inside heat exchanger 30 is set in a range of 9 MPa–11 MPa in accordance with the temperature and the air amount (blower voltage) of air flowing into the inside heat exchanger 30 and the target air temperature (TAO), the heating operation can be performed with a sufficient heating capacity while the actual COP is maintained at a high value.

Figure 27:
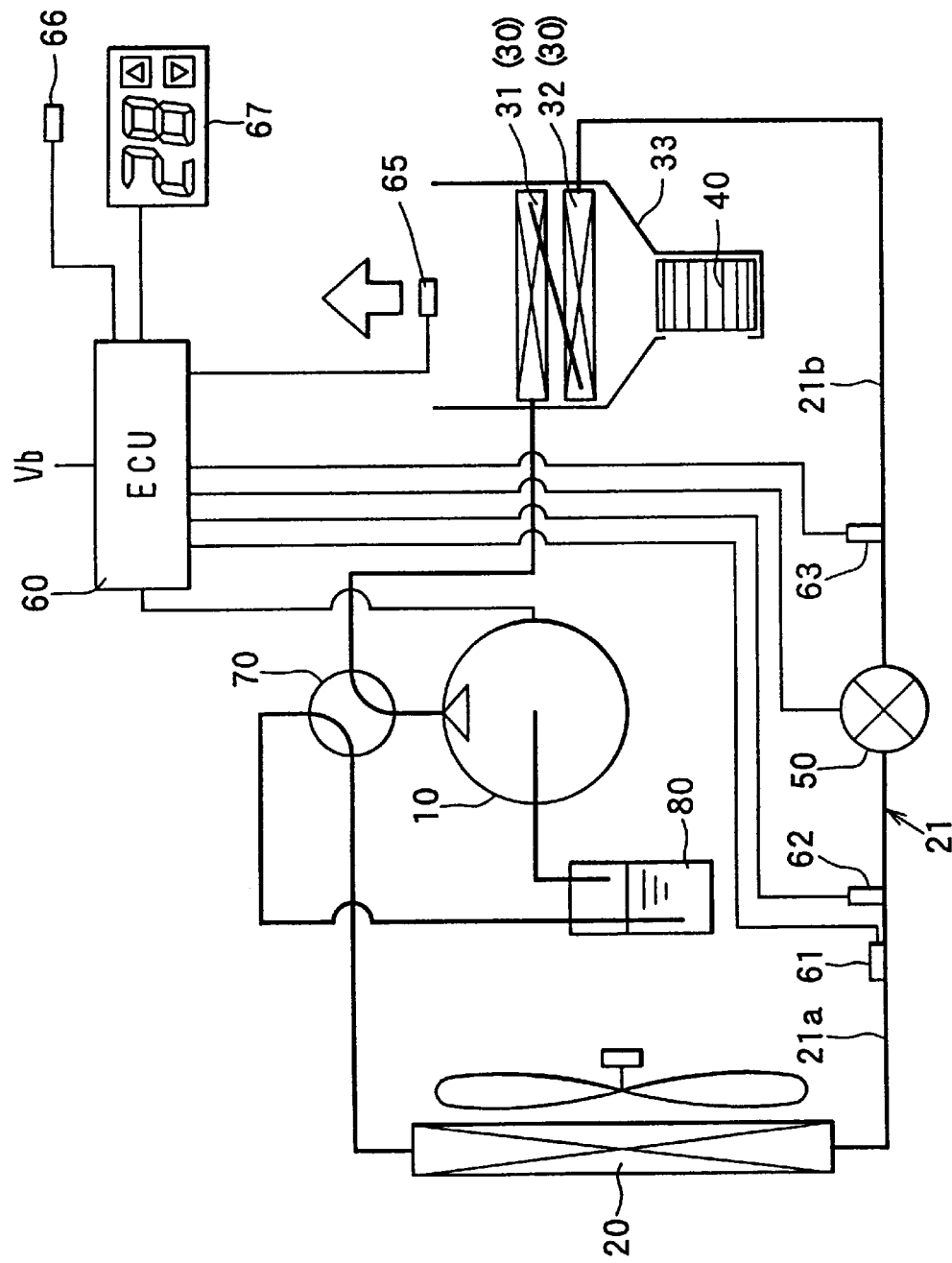
FIG. 27 a schematic view showing a heat pump cycle system during the heating operation according to an eighth preferred embodiment of the present invention.

An eighth preferred embodiment of the present invention will be now described with reference to FIGS. 27–29. As shown in FIG. 27, in the eighth embodiment, the second temperature sensor 64 for detecting the temperature of air before flowing into the inside heat exchanger 30 as described in the above-described first embodiment is omitted. Therefore, in the eighth embodiment, the target pressure of high-pressure side refrigerant is set to be maintained in a range of 9 MPa–11 MPa based on the air amount (blower voltage Vb) and the target air temperature (TAO). Thus, similarly to the above-described seventh embodiment of the present invention, the heating operation can be performed with a sufficient heating capacity while the actual COP is maintained at a high value.

Figure 28:
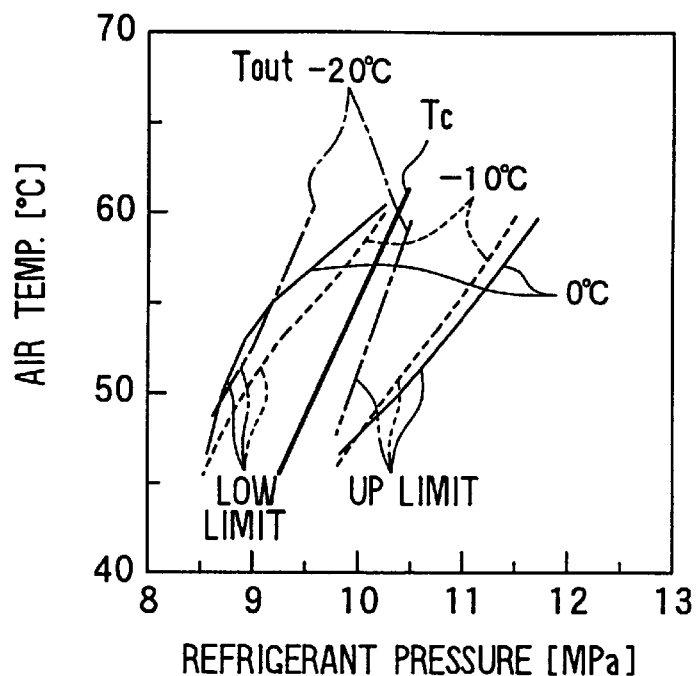
FIG. 28 is a graph showing the relationship between a temperature of air blown from an inside heat exchanger and a refrigerant pressure on an inlet of an inside heat exchanger, according to the eighth embodiment.
Figure 29:
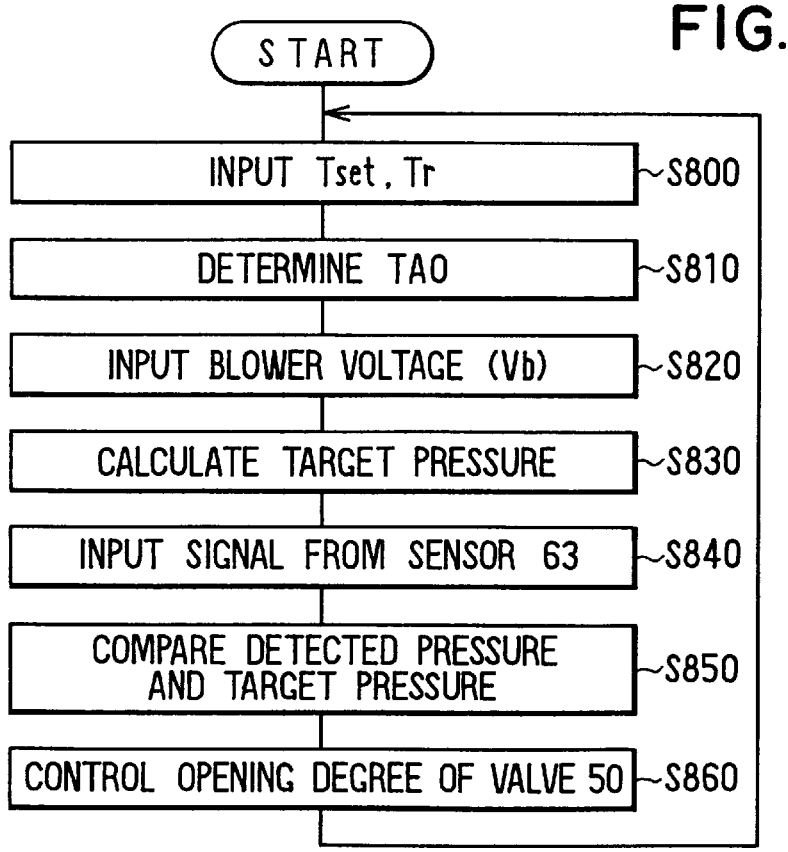
FIG. 29 is a flow diagram for controlling an expansion valve of the heat pump cycle system according to the eighth embodiment.

In the eighth embodiment of the present invention, because the temperature of air flowing into the inside heat exchanger 30 is not detected, the target pressure of high-pressure side refrigerant is not changed with the temperature of air flowing into the inside heat exchanger 30 as shown by the solid line Tc in FIG. 28, but is controlled based on the air amount flowing into the inside heat exchanger 30 and the temperature of air blown into the passenger compartment. In FIG. 28, the other lines except for the solid line Tc is indicated for a comparison with the graph in FIG. 26.

Next, operation of the expansion valve 50 during the heating operation according to the eighth embodiment will be described with reference to FIG. 29. As shown in FIG. 29, firstly, the set temperature (Tset) set by the temperature setting unit 67 and the temperature (Tr) inside the passenger compartment are input into the ECU 60 at step S800. Next, at step S810, the target air temperature (TAO) of the passenger compartment is determined based on the set temperature (Tset) and the temperature (Tr) inside the passenger compartment. Next, a blower voltage (Vb) is input into the ECU 60 at step S820, and a target pressure during the heating operation is calculated based on the blower voltage (i.e., air amount) and the target air temperature (TAO). Further, pressure detected by the second pressure sensor 63 is input at step S840, and the detected pressure and the target pressure of refrigerant are compared at step S850. Next, the opening degree of the expansion valve 50 is controlled based on the detected pressure and the target pressure of refrigerant during the heating operation, at step S860. That is, when the detected pressure of refrigerant is larger than the target pressure of refrigerant, the opening degree of the electric expansion valve 50 is increased so that the pressure of refrigerant discharged from the compressor 10 is decreased. On the other hand, when the detected pressure of refrigerant is smaller than the target pressure of refrigerant, the opening degree of the electric expansion valve 50 is decreased so that the pressure of refrigerant discharged from the compressor 10 is increased. Further, when the detected pressure of refrigerant is equal to the target pressure of refrigerant, the opening degree of the expansion valve 50 is maintained. Thereafter, the program returns to step S800, and repeats the operations of steps S800–S860.

In the eighth preferred embodiment of the present invention, the rotation speed of the compressor 10 is controlled so that the detected temperature of air blown into the passenger compartment approximately corresponds to the target air temperature (TAO). That is, when the detected temperature of air blown into the passenger compartment is lower than the target air temperature, the rotation speed of the compressor 10 is increased. On the other hand, when the detected temperature of air blown into the passenger compartment is higher than the target air temperature, the rotation speed of the compressor 10 is decreased.

Figure 30:
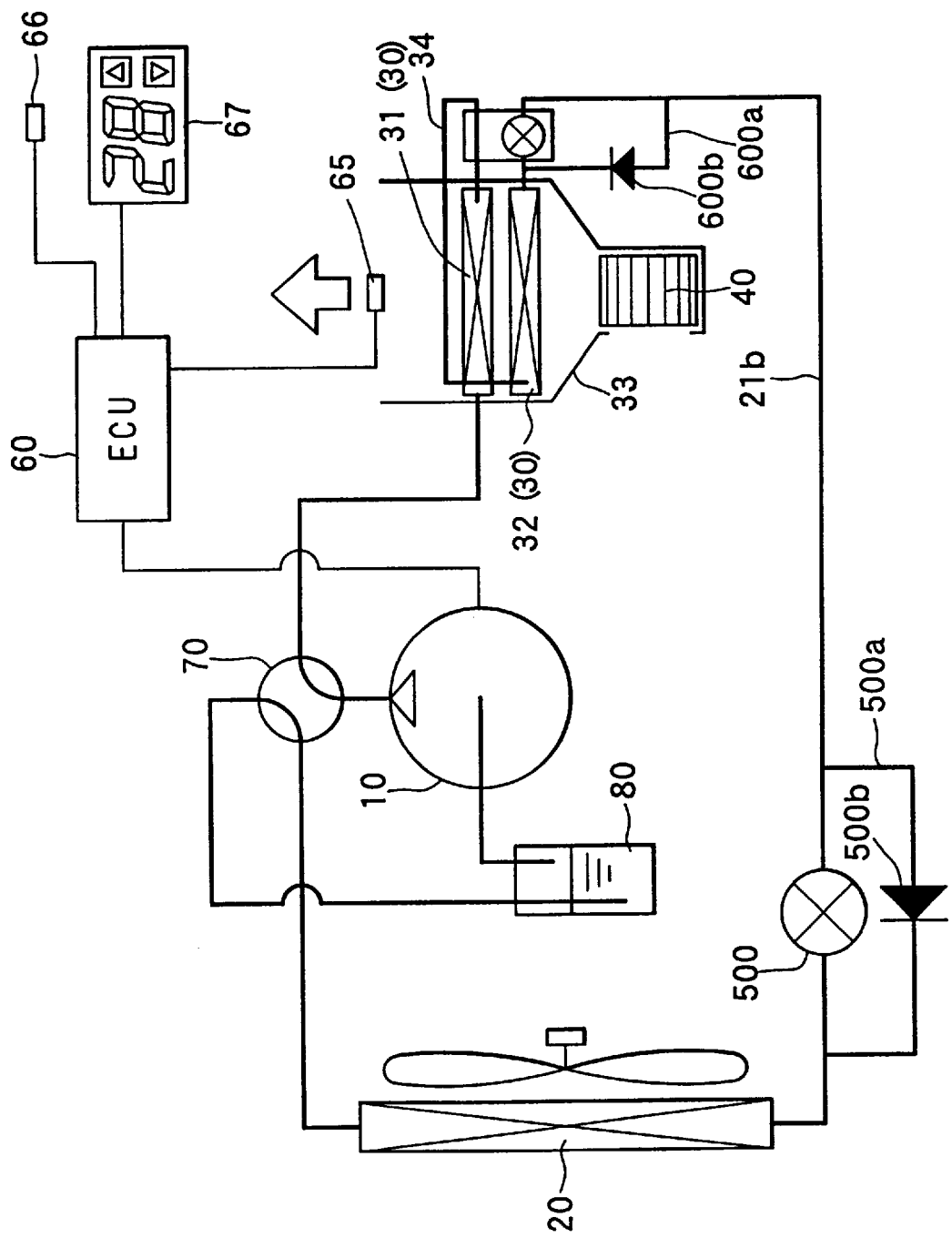
FIG. 30 is a schematic view showing a heat pump cycle system during the heating operation according to a ninth preferred embodiment of the present invention.
Figure 31:
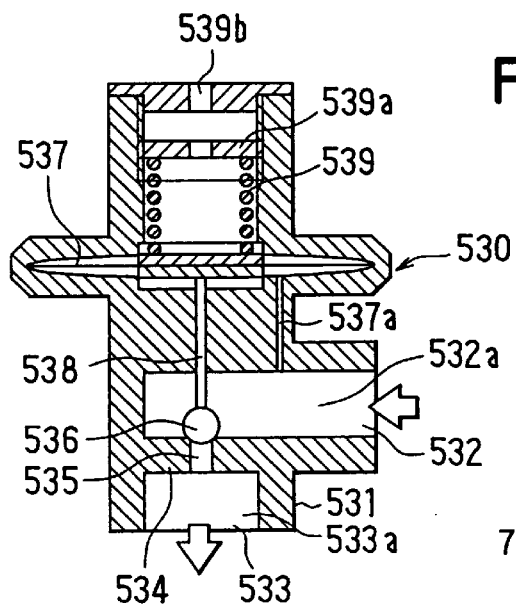
FIG. 31 is a schematic sectional view of an expansion valve of the heat pump cycle system according to the ninth embodiment.
Figure 32:
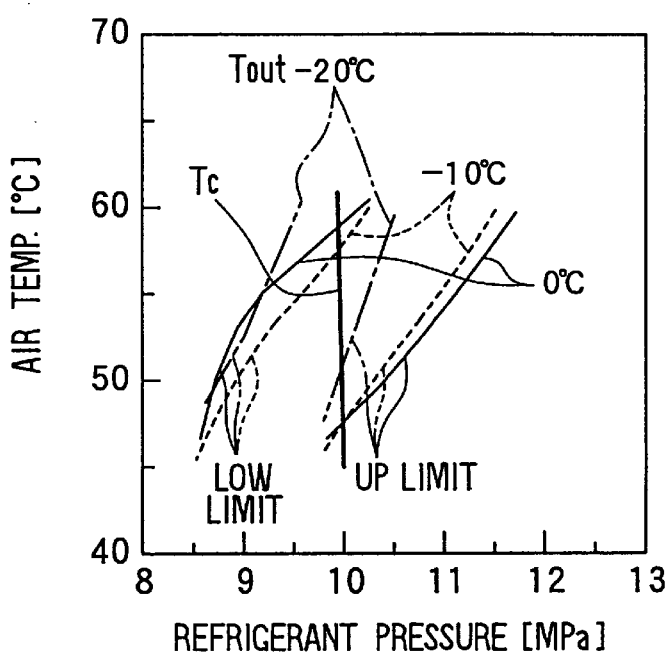
FIG. 32 is a graph showing the relationship between a temperature of air blown from an inside heat exchanger and a refrigerant pressure on an inlet of an inside heat exchanger, according to the ninth embodiment.

A ninth preferred embodiment of the present invention will be now described with reference to FIGS. 30–32. In the ninth embodiment of the present invention, the pressure of high-pressure side refrigerant is controlled to a predetermined pressure within the range of 9 MPa–11 MPa, without being related to the outside air temperature (Tout) and the set temperature (Tset). FIG. 30 is a schematic view of a heat pump cycle system according to the ninth embodiment. In the ninth embodiment, the components similar to those in the fourth embodiment are indicated with the same reference numbers, and the explanation thereof is omitted. In the ninth embodiment, the structure and the operation of an expansion valve 530 are mainly described. As shown in FIG. 31, a housing 531 forming a refrigerant passage includes a refrigerant inlet port 532 and a refrigerant outlet port 533. A first space 532a communicating with the refrigerant inlet port 532 and a second space 533a communicating with the refrigerant outlet port 533 are partitioned by a partition wall portion 534. A valve port 535 is provided in the partition wall portion 535 to penetrate through the partition wall portion 535, so that the first and second spaces 532a, 533a communicates with each other through the valve port 535.

An opening degree of the valve port 535 is adjusted by a sphere valve body 536, and a thin film like diaphragm 537 is displaced in accordance with the inner pressure (i.e., the pressure of high-pressure side refrigerant) of the first space 532a. The displacement of the diaphragm 537 is transmitted to the valve body 536 through a connection rod 538. The pressure of the high-pressure side refrigerant, that is, the inner pressure of the first space 532a is applied to the diaphragm 537 so that the valve body 536 and the connection rod 538 are moved in a direction for increasing the opening degree of the valve port 535. On the other hand, the pressure of the atmosphere and elastic force of a coil spring 539 are applied to the diaphragm 537 so that the valve body 536 and the connection rob 538 are moved in a direction for decreasing the opening degree of the valve port 535.

The inner pressure of the first place 532a is introduced to the diaphragm 537 through a pressure introduction port 537a. The elastic force of the coil spring 539 is adjusted by a spring weight 539a, and air is introduced from an air hole 539b.

Next, operation of the expansion valve 530 according to the ninth embodiment of the present invention will be now described. The opening degree of the valve port 535 is determined by the displacement of the diaphragm 537, and the displacement of the diaphragm 537 is determined based on a balance between the valve-closing force due to the air pressure and the elastic force of the coil spring 539 and the valve-opening force due to the inner pressure (i.e., the pressure of the high-pressure side refrigerant) of the first space 532a.

When the expansion valve 530 is set in such a manner that the valve port 535 is closed when the pressure of high-pressure side refrigerant is a predetermined pressure more than 9 MPa and lower than 11 MPa, the valve port 535 is opened when the pressure of the high-pressure side refrigerant is larger than the predetermined pressure, and the valve port 535 is closed when the pressure of the high-pressure side refrigerant is lower than the predetermined pressure. Therefore, in the ninth embodiment of the present invention, the pressure of high-pressure side refrigerant can be maintained approximately at 10 MPa as shown by the solid line Tc in FIG. 32.

Figure 33:
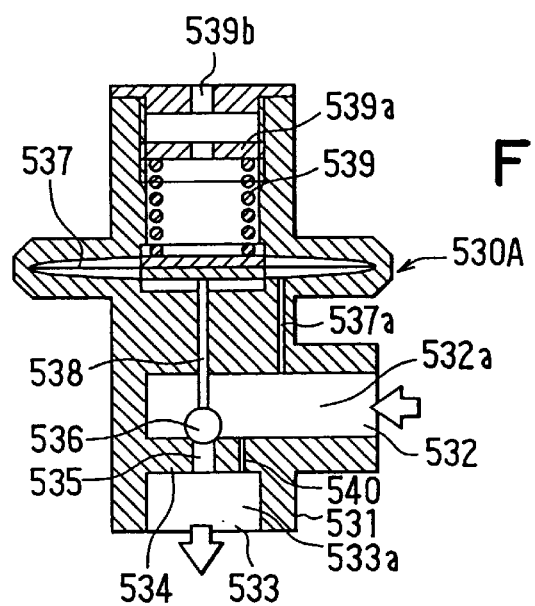
FIG. 33 is a schematic sectional view of an expansion valve according to a tenth preferred embodiment.

A tenth preferred embodiment of the present invention will be now described with reference to FIG. 33. In the tenth embodiment of the present invention, the structure similar to that of the expansion valve 530 in the ninth embodiment are indicated with the same reference numbers, and the explanation thereof is omitted. In an expansion valve 530A of the tenth embodiment of the present invention, except for the valve port 535 of the expansion valve 530 described in the ninth embodiment, a bleeding port 540 is provided in the partition wall 534 so that both of the first and second spaces 532a, 533a also communicate with each other through the bleeding port 540. In the bleeding port 540, a sufficient large pressure loss is generated, as compared with the valve port 535.

In the above-described eighth embodiment, the expansion valve 530 is maintained at the closing state of the valve port 535 until the pressure of high-pressure side refrigerant is increased to a predetermined pressure (e.g., 10 MPa). Therefore, at a starting time of the heat pump cycle system of the eighth embodiment, even when the compressor 10 operates, refrigerant does not circulate in the heat pump cycle system until the pressure of high-pressure side refrigerant is larger than the predetermined pressure (e.g., 10 MPa), and refrigerant staying in the low pressure side (e.g., the side of the outside heat exchanger 20) moves into the high pressure side (e.g., the side of the inside heat exchanger 30). In this case, when the temperature of outside air is low, refrigerant moved into the high pressure side is condensed. Therefore, the pressure of refrigerant in the high pressure side is hardly increased, and the closing state of the valve port 535 is continued in the expansion valve 530. Thus, the amount of refrigerant staying in the low pressure side is gradually reduced, and pressure of refrigerant on the high-pressure side is hardly increased even when the compressor 10 operates. As a result, the heating capacity of the heat pump cycle system cannot be improved.

However, according to the tenth embodiment of the present invention, the bleeding port 540 through which the first and second spaces 532a, 533a communicate with each other is provided in the partition wall 534. Therefore, refrigerant circulates through the bleeding port 540 even when the valve port 535 is closed, and it can prevent the amount of refrigerant staying in the low pressure side from being gradually reduced. Thus, the heat pump cycle system of the tenth embodiment provides a sufficient heating capacity.

Figure 34:
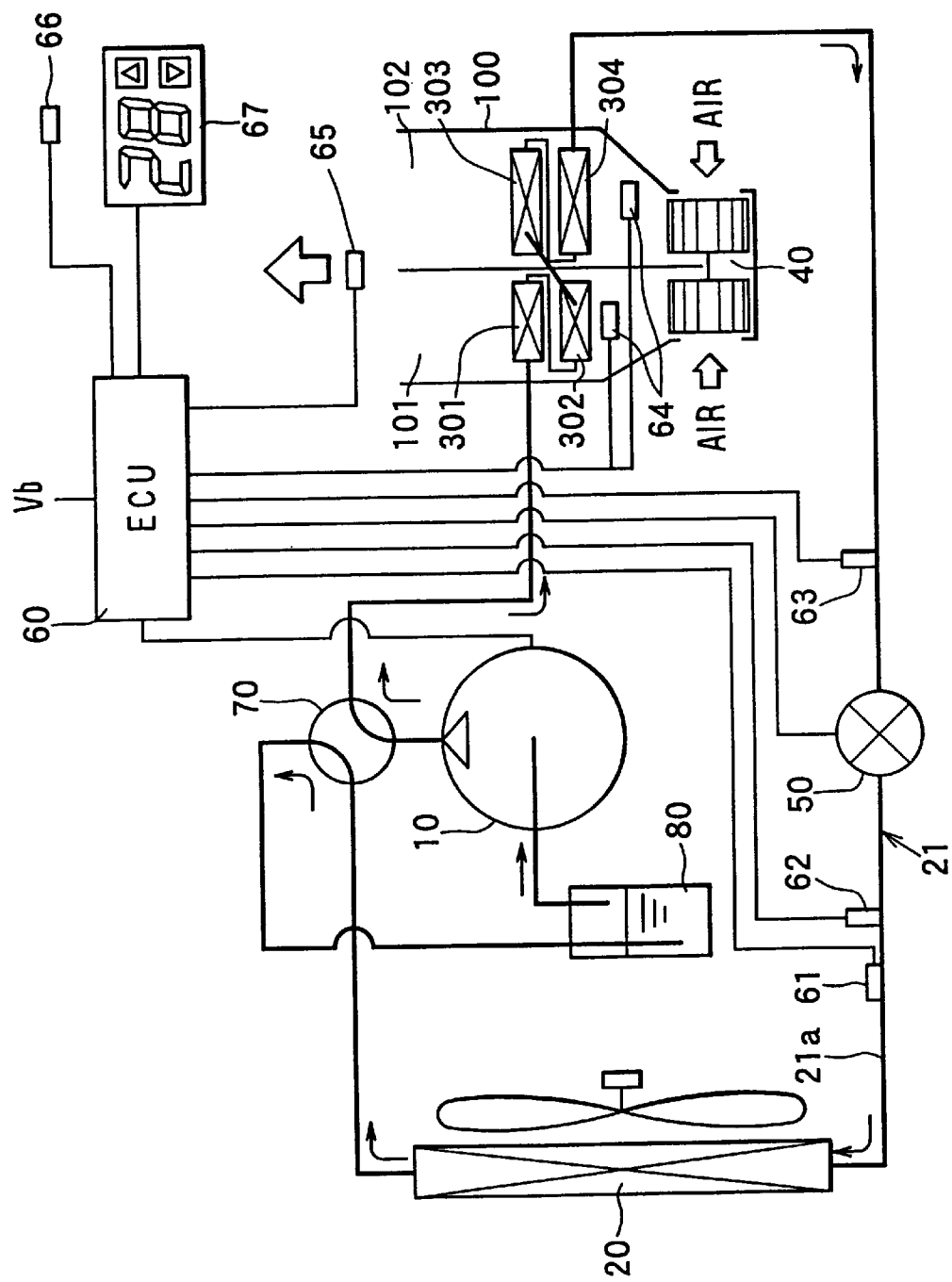
FIG. 34 is a schematic view showing a heat pump cycle system during the heating operation according to an eleventh preferred embodiment of the present invention.
Figure 35:
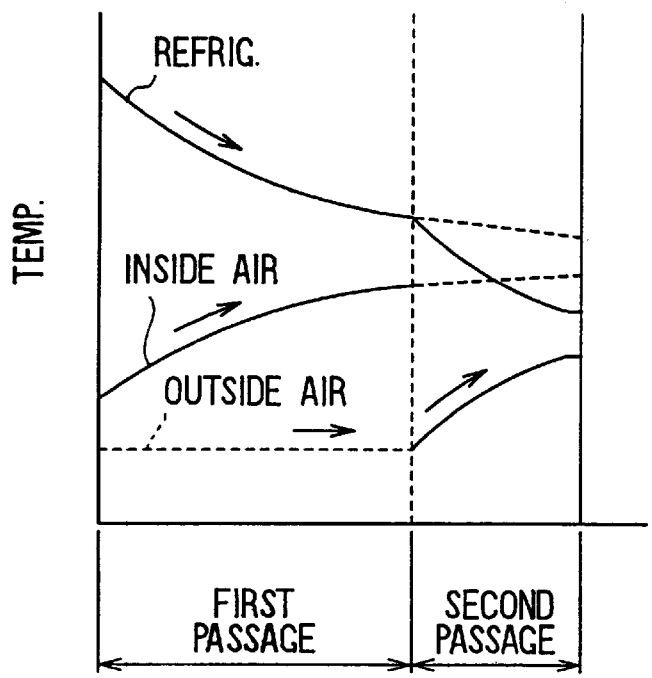
FIG. 35 is a graph showing a temperature change of refrigerant and a temperature change of air according to the eleventh embodiment.

An eleventh preferred embodiment of the present invention will be now described with reference to FIGS. 34, 35. In the eleventh embodiment of the present invention, the components similar to those in the above-described first embodiment are indicated with the same reference numbers, and the explanation thereof is omitted. In the eleventh embodiment, an air passage of an air conditioning case 100 is partitioned into a first passage 101 through which inside air is blown into the passenger compartment again, and a second passage 102 through which selected inside air or outside air is blown into the passenger compartment. Therefore, in a vehicle air conditioner having the air conditioning case 100 in which the first and second passages 101, 102 can be partitioned from each other, an inside/outside double layer flow mode can be set.

In the eleventh embodiment of the present invention, the inside heat exchanger 30 includes four inside heat exchangers 301, 302, 303, 304 connected to each other in line relative to the refrigerant flow direction. That is, refrigerant flows through the four inside heat exchangers 301, 302, 303, 304 in this order. Both the inside heat exchangers 301, 302, placed on the refrigerant upstream side during the heating operation, is disposed in the first passage 101. On the other hand, both the inside heat exchangers 303, 304, placed on the refrigerant downstream side during the heating operation, are disposed in the second passage 102. Further, the inside heat exchanger 302 is disposed at an upstream air side from the inside heat exchanger 301 in the air flow direction within the first passage 101, and the inside heat exchanger 304 is disposed at an upstream air side from the inside heat exchanger 303 in the air flow direction within the second passage 102.

According to the eleventh embodiment of the present invention, during an inside/outside double flow mode of the heating operation, the vehicle air conditioner prevents the windshield from being frosted by introducing outside air, while preventing the heating capacity for the passenger compartment from being decreased due to the introduced outside air.

On the other hand, in the heat pump cycle system using the $CO_2$ refrigerant where pressure of high-pressure side refrigerant is larger than the critical pressure, temperature of refrigerant is decreased as refrigerant flows from a refrigerant inlet side of the inside heat exchanger 301 toward a refrigerant outlet side of the inside heat exchanger 304. Therefore, if the temperature of air flowing into the inside heat exchangers 301, 302, 303, 304 is equal, a temperature difference between air and refrigerant in the inside heat exchangers 303, 304 placed at a downstream refrigerant side becomes smaller, and heat quantity transmitted from refrigerant to air in the inside heat exchangers 303, 304 also becomes smaller.

According to the eleventh embodiment of the present invention, both the inside heat exchangers 303, 304, placed at a refrigerant downstream side during the heating operation within the four inside heat exchangers 301–304, are disposed in the second passage 102, and outside air flows through the second passage 102. Therefore, even when the temperature of refrigerant flowing through the inside heat exchanger 303, 304 is low, a temperature difference between refrigerant and outside air can be made larger in the second passage 102 as shown by the solid lines in FIG. 35. Thus, heat quantity transmitted from refrigerant to air can be increased in the second passage 102. If only inside air flows through the second passage 102, a temperature difference between refrigerant and inside air becomes smaller in the second passage 102, as shown by the chain lines in FIG. 35.

Further, the inside heat exchanger 302 at an upstream air side of the inside heat exchanger 301 in the first passage 101 is disposed on a downstream refrigerant side of the inside heat exchanger 301, and the inside heat exchanger 304 at an upstream air side of the inside heat exchanger 303 in the second passage 102 is disposed on a downstream refrigerant side of the inside heat exchanger 303. Therefore, heat quantity transmitting to air can be further increased.

Although the present invention has been fully described in connection with the preferred embodiments thereof with reference to the accompanying drawings, it is to be noted that various changes and modifications will become apparent to those skilled in the art.

For example, in each of the above-described embodiments, $CO_2$ refrigerant is used in the heat pump cycle system. However, the other refrigerant such as ethylene, ethane and nitrogen oxide may be used.

In the above-described first and second embodiments, the temperature of air flowing into the inside heat exchanger 30 is detected by the second temperature sensor 64. However, the second temperature sensor 64 may be omitted. In this case, an outside air temperature sensor for detecting temperature of outside air may be provided, and the temperature of air flowing into the inside heat exchanger 30 may be estimated from the outside air temperature detected by the outside air temperature sensor, the inside air temperature detected by the fourth temperature sensor 66 and a flow ratio between inside air and outside air.

Figure 36A:
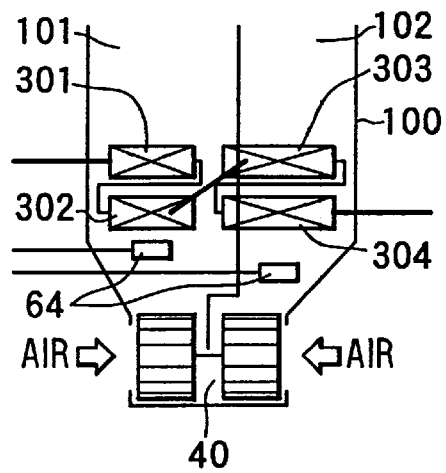
FIGS. 36A and 36B are schematic views showing modifications of the heat pump cycle system of the eleventh embodiment.
Figure 36B:
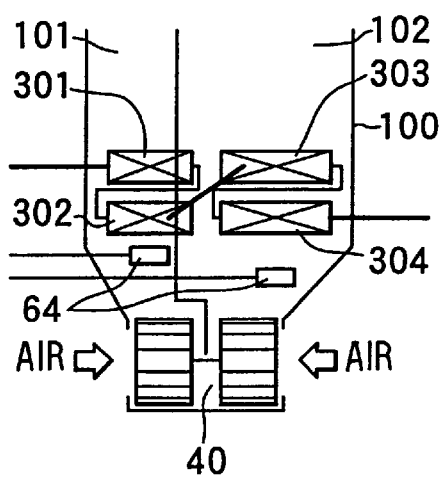

Further, in the above-described eleventh embodiment of the present invention, the inside heat exchangers 301, 302 are disposed in the first passage 101, and the inside heat exchangers 303, 304 are disposed in the second passage 102, respectively. However, to improve the heat-transmission capacity of the inside heat exchangers 301–304, at least any one of the inside heat exchangers 301–304 may be disposed over both the first and second passages 101, 102 as shown in FIGS. 36A, 36B.

Such changes and modifications are to be understood as being within the scope of the present invention as defined by the appended claims.

What is claimed is:

1. A heat pump cycle system for selectively setting cooling operation and heating operation for a compartment, said heat pump cycle system comprising:

a compressor for compressing refrigerant, said compressor having a discharge port for discharging refrigerant with a pressure higher than the critical pressure;

a case for forming therein an air passage through which air flows into the compartment;

a first heat exchanger disposed in said case for performing heat exchange between air inside said case and refrigerant flowing therein, said first heat exchanger includes a plurality of first heat-exchanging portions arranged in line relative to a flow direction of air flowing through said air passage;

a second heat exchanger disposed outside said case, for performing heat exchange between air outside said case and refrigerant flowing therein;

a refrigerant pipe forming a refrigerant passage through which refrigerant in said first heat exchanger and refrigerant in said second heat exchanger communicate with each other;

an expansion valve, disposed in said refrigerant passage, for reducing pressure of refrigerant; and a switching unit for switching a communication between said discharge port of said compressor and an inlet of said first heat exchanger, and a communication between said discharge port of said compressor and an inlet of said second heat exchanger, wherein;

said first heat-exchanging portions of said first heat exchanger are connected in line relative to a flow direction of refrigerant flowing therein;

one of said first heat-exchanging portions, at a most downstream side relative to the flow direction of air, is placed at a most upstream side relative to the flow direction of refrigerant during the heating operation;

said first heat-exchanging portions has a most upstream heat-exchanging portion and a most downstream heat-exchanging portion relative to the flow direction of refrigerant during the heating operation; and said expansion valve is controlled based on temperature of refrigerant in any a position from a refrigerant outlet of said most upstream heat-exchanging portion and a refrigerant inlet of said most downstream heat exchanging portion during the heating operation.

2. The heat pump cycle system according to claim 1, wherein the refrigerant is carbon dioxide.

3. The heat pump cycle system according to claim 1, wherein said expansion valve is an electrical expansion valve.

4. The heat pump cycle system according to claim 1, wherein said expansion valve is a mechanical expansion valve.

5. A heat pump cycle system for selectively setting cooling operation and heating operation for a compartment, said heat pump cycle system comprising:

a compressor for compressing refrigerant, said compressor having a discharge port for discharging refrigerant with a pressure higher than the critical pressure;

a case for forming therein an air passage through which air flows into the compartment;

a first heat exchanger disposed in said case for performing heat exchange between air inside said case and refrigerant flowing therein, said first heat exchanger includes a plurality of first heat-exchanging portions arranged in line relative to a flow direction of air flowing through said air passage;

a second heat exchanger disposed outside said case, for performing heat exchange between air outside said case and refrigerant flowing therein;

a refrigerant pipe forming a refrigerant passage through which refrigerant in said first heat exchanger and refrigerant in said second heat exchanger communicate with each other;

an expansion valve, disposed in said refrigerant passage, for reducing pressure of refrigerant;

a control unit for controlling an opening degree of said expansion valve; and a switching unit for switching a communication between said discharge port of said compressor and an inlet of said first heat exchanger, and a communication between said discharge port of said compressor and an inlet of said second heat exchanger, wherein;

said first heat-exchanging portions of said first heat exchanger are connected in line relative to a flow direction of refrigerant flowing therein;

one of said first heat-exchanging portions, at a most downstream side relative to the flow direction of air, is placed at a most upstream side relative to the flow direction of refrigerant during the heating operation;

said control unit includes a temperature setting unit for setting a temperature of the compartment, an inlet air temperature sensor for detecting a temperature of air before flowing into said first heat exchanger, and target pressure determining means for determining a target pressure of refrigerant discharged from said discharge port of said compressor during the heating operation based on the temperature detected by said inlet air temperature sensor and the temperature set by said temperature setting unit, so that coefficient of performance becomes approximately maximum; and said control unit controls said opening degree of said expansion valve in such a manner that pressure of refrigerant discharged from said compressor becomes equal to the target pressure.

6. The heat pump cycle system according to claim 5, wherein said target pressure determining means determines said target pressure during the heating operation, based on the temperature detected by said inlet air temperature sensor, the temperature set by said temperature setting unit, an air amount flowing into said first heat exchanger and the coefficient of performance.

7. A heat pump cycle system for selectively setting cooling operation and heating operation for a compartment, said heat pump cycle system comprising:

a compressor for compressing refrigerant, said compressor having a discharge port for discharging refrigerant with a pressure higher than the critical pressure;

a case for forming therein an air passage through which air flows into the compartment;

a first heat exchanger disposed in said case for performing heat exchange between air inside said case and refrigerant flowing therein, said first heat exchanger includes a plurality of first heat-exchanging portions arranged in line relative to a flow direction of air flowing through said air passage;

a second heat exchanger disposed outside said case, for performing heat exchange between air outside said case and refrigerant flowing therein;

a refrigerant pipe forming a refrigerant passage through which refrigerant in said first heat exchanger and refrigerant in said second heat exchanger communicate with each other;

an expansion valve, disposed in said refrigerant passage, for reducing pressure of refrigerant;

a control unit for controlling an opening degree of said expansion valve; and a switching unit for switching a communication between said discharge port of said compressor and an inlet of said first heat exchanger, and a communication between said discharge port of said compressor and an inlet of said second heat exchanger, wherein;

said first heat-exchanging portions of said first heat exchanger are connected in line relative to a flow direction of refrigerant flowing therein;

one of said first heat-exchanging portions, at a most downstream side relative to the flow direction of air, is placed at a most upstream side relative to the flow direction of refrigerant during the heating operation;

said control unit includes a temperature setting unit for setting a temperature of the compartment, first target pressure determining means for determining a first target pressure of refrigerant discharged from said compressor during the heating operation based on the temperature set by said temperature setting unit, so that coefficient of performance becomes approximately maximum, and second target pressure determining means for determining a second target pressure of refrigerant discharged from said compressor during the cooling operation based on the temperature set by said temperature setting unit, so that coefficient of performance becomes approximately maximum; and said control unit controls said opening degree of said expansion valve in such a manner that pressure of refrigerant discharged from said compressor becomes equal to the first target pressure during the heating operation, and pressure of refrigerant discharged from said compressor becomes equal to the second target pressure during the cooling operation.

8. The heat pump cycle system according to claim 7, wherein said first target pressure is in a range of 9 MPa–11 MPa.

9. A heat pump cycle system for selectively setting cooling operation and heating operation for a compartment, said heat pump cycle system comprising:

a compressor for compressing refrigerant, said compressor having a discharge port for discharging refrigerant with a pressure higher than the critical pressure;

a case for forming therein an air passage through which air flows into the compartment;

a first heat exchanger disposed in said case for performing heat exchange between air inside said case and refrigerant flowing therein, said first heat exchanger includes a plurality of first heat-exchanging portions arranged in line relative to a flow direction of air flowing through said air passage;

a second heat exchanger disposed outside said case, for performing heat exchange between air outside said case and refrigerant flowing therein;

a refrigerant pipe forming a refrigerant passage through which refrigerant in said first heat exchanger and refrigerant in said second heat exchanger communicate with each other;

an expansion valve, disposed in said refrigerant passage, for reducing pressure of refrigerant;

a switching unit for switching a communication between said discharge port of said compressor and an inlet of said first heat exchanger, and a communication between said discharge port of said compressor and an inlet of said second heat exchanger; and a control unit for controlling an opening degree of said expansion valve, wherein:

said control unit includes a temperature setting unit for setting a temperature of the compartment, an inlet air temperature sensor for detecting a temperature of air before flowing into said first heat exchanger, and target pressure determining means for determining a target pressure of refrigerant discharged from said discharge port of said compressor during the heating operation based on the temperature detected by said inlet air temperature sensor and the temperature set by said temperature setting unit, so that coefficient of performance becomes approximately maximum; and said control unit controls said opening degree of said expansion valve in such a manner that pressure of refrigerant discharged from said compressor becomes equal the target pressure.

10. The heat pump cycle system according to claim 9, wherein said target pressure determining means determines said target pressure during the heating operation, based on the temperature detected by said inlet air temperature sensor, the temperature set by said temperature setting unit, an air amount flowing into said first heat exchanger and the coefficient of performance.

11. A heat pump cycle system for selectively setting cooling operation and heating operation for a compartment, said heat pump cycle system comprising:

a compressor for compressing refrigerant, said compressor having a discharge port for discharging refrigerant with a pressure higher than the critical pressure;

a case for forming therein an air passage through which air flows into the compartment;

a first heat exchanger disposed in said case for performing heat exchange between air inside said case and refrigerant flowing therein, said first heat exchanger includes a plurality of first heat-exchanging portions arranged in line relative to a flow direction of air flowing through said air passage;

a second heat exchanger disposed outside said case, for performing heat exchange between air outside said case and refrigerant flowing therein;

a refrigerant pipe forming a refrigerant passage through which refrigerant in said first heat exchanger and refrigerant in said second heat exchanger communicate with each other;

an expansion valve, disposed in said refrigerant passage, for reducing pressure of refrigerant;

a switching unit for switching a communication between said discharge port of said compressor and an inlet of said first heat exchanger, and a communication between said discharge port of said compressor and an inlet of said second heat exchanger; and a control unit for controlling an opening degree of said expansion valve, wherein:

said control unit includes a temperature setting unit for setting a temperature of the compartment, first target pressure determining means for determining a first target pressure of refrigerant discharged from said compressor during the heating operation based on the temperature set by said temperature setting unit, so that coefficient of performance becomes approximately maximum, and second target pressure determining means for determining a second target pressure of refrigerant discharged from said compressor during the cooling operation based on the temperature set by said temperature setting unit, so that coefficient of performance becomes approximately maximum; and said control unit controls said opening degree of said expansion valve in such a manner that pressure of refrigerant discharged from said compressor becomes equal the first target pressure during the heating operation, and pressure of refrigerant discharged from said compressor becomes equal to the second target pressure during the cooling operation.

12. The heat pump cycle system according to claim 11, wherein said first target pressure is in a range of 9 MPa–11 MPa.

13. An air conditioner for selectively setting cooling operation and heating operation for a passenger compartment of a vehicle, said air conditioner comprising:

a compressor for compressing refrigerant, said compressor having a discharge port for discharging refrigerant with a pressure higher than the critical pressure;

a case for forming therein a first air passage through which air inside the passenger compartment flows toward the passenger compartment, and a second air passage through which selectively introduced air inside the passenger compartment and air outside the passenger compartment flows toward the passenger compartment;

a first heat exchanger disposed in said case for performing heat exchange between air inside said case and refrigerant flowing therein, said first heat exchanger includes a plurality of heat-exchanging portions arranged in line relative to a flow direction of refrigerant flowing through said first heat exchanger;

a second heat exchanger disposed outside said case, for performing heat exchange between air outside the passenger compartment and refrigerant flowing therein;

a refrigerant pipe forming a refrigerant passage through which refrigerant in said first heat exchanger and refrigerant in said second heat exchanger communicate with each other;

an expansion valve, disposed in said refrigerant passage, for reducing pressure of refrigerant; and a switching unit for switching a communication between said discharge port of said compressor and an inlet of said first heat exchanger, and a communication between said discharge port of said compressor and an inlet of said second heat exchanger, wherein:

said heat-exchanging portions of said first heat exchanger have a refrigerant downstream portion in the flow direction of refrigerant during the heating operation; and at least a part of said refrigerant downstream portion is disposed in said second air passage.

14. The air conditioner according to claim 13, wherein:

said heat-exchanging portions of said first heat exchanger are divided into plural first portions disposed in said first air passage, and plural second portions disposed in said second air passage;

said plural first portions are disposed in said first air passage in such a manner that one of said first portions, at a most downstream side relative to a flow direction of air, is placed at a most upstream side of said first portions relative to the flow direction of refrigerant during the heating operation; and said plural second portions are disposed in said second air passage in such a manner that one of said second portions, at a most downstream side relative to a flow direction of air, is placed at a most upstream side of said second portions relative to the flow direction of refrigerant during the heating operation.

15. The air conditioner according to claim 13, further comprising a control unit for controlling an opening degree of said expansion valve, wherein:

said control unit includes
a temperature setting unit for setting a temperature of the compartment,
first target pressure determining means for determining a first target pressure of refrigerant discharged from said compressor during the heating operation based on the temperature set by said temperature setting unit, so that coefficient of performance becomes approximately maximum, and
second target pressure determining means for determining a second target pressure of refrigerant discharged from said compressor during the cooling operation based on the temperature set by said temperature setting unit, so that coefficient of performance becomes approximately maximum; and
said control unit controls said opening degree of said expansion valve in such a manner that pressure of refrigerant discharged from said compressor becomes equal to the first target pressure during the heating operation, and pressure of refrigerant discharged from said compressor becomes equal to the second target pressure during the cooling operation.

16. The air conditioner according to claim 15, wherein said first target pressure is in a range of 9 MPa–11 MPa.

* * * * *